(12) United States Patent
Ida et al.

(10) Patent No.: US 11,315,220 B2
(45) Date of Patent: Apr. 26, 2022

(54) DISTANCE MEASURING APPARATUS, VIBRATION MEASURING APPARATUS, AND INDUSTRIAL COMPUTED TOMOGRAPHY APPARATUS

(71) Applicant: KABUSHIKI KAISHA TOSHIBA, Minato-ku (JP)

(72) Inventors: Takashi Ida, Kawasaki (JP); Kenzo Isogawa, Yokohama (JP); Atsushi Matsumura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/285,997

(22) Filed: Feb. 26, 2019

(65) Prior Publication Data
US 2019/0378248 A1    Dec. 12, 2019

(30) Foreign Application Priority Data
Jun. 7, 2018    (JP) .............. JP2018-109559

(51) Int. Cl.
*G06T 5/00*    (2006.01)
*G06N 3/04*    (2006.01)
(Continued)

(52) U.S. Cl.
CPC ............ *G06T 5/002* (2013.01); *G01S 7/4808* (2013.01); *G01S 17/42* (2013.01); *G06N 3/0454* (2013.01); *G06N 3/0481* (2013.01); *G06N 3/084* (2013.01)

(58) Field of Classification Search
CPC ......... G01N 21/538; G06T 5/002; G06T 5/50; G06T 2207/20221
See application file for complete search history.

(56) References Cited

U.S. PATENT DOCUMENTS 7,583,364 B1 * 9/2009 Mayor ................ G01N 21/538
                                                    356/4.01
9,898,848 B2 * 2/2018 Black ...................... G06T 17/00
(Continued)

FOREIGN PATENT DOCUMENTS

JP    2017-223648 A    12/2017
JP    2018-77786 A    5/2018
(Continued)

OTHER PUBLICATIONS

K. Zhang, et al., "Beyond a Gaussian Denoiser: Residual Learning of Deep CNN for Image Denoising", IEEE Transactions on Image Processing, vol. 26, No. 7, 2017, pp. 3142-3155.

*Primary Examiner* — Joshua L Schwartz
(74) *Attorney, Agent, or Firm* — Oblon, McClelland, Maier & Neustadt, L.L.P.

(57) ABSTRACT

According to one embodiment, a distance measuring apparatus includes a processing circuit and a memory. The processing circuit generates a distance image by measuring distances to an obstacle by using the time until the emitted light is reflected from the obstacle and returned as reflected light. The processing circuit generates an intensity image by measuring the intensity of the reflected light or the intensity of the environmental light. The memory stores a learned model for generating a denoise image, in which noise of the distance image is reduced, based on the distance image and the intensity image. The processing circuit inputs the distance image and the intensity image to the learned model, and generates the

4 Claims, 20 Drawing Sheets

(51) Int. Cl.
*G06N 3/08* (2006.01)
*G01S 17/42* (2006.01)
*G01S 7/48* (2006.01)

(56) References Cited

U.S. PATENT DOCUMENTS

2015/0296152 A1* 10/2015 Fanello .................. G06T 5/002
                                                           348/241
2016/0321523 A1* 11/2016 Sen ........................ G06N 7/005
2018/0349759 A1    12/2018 Isogawa et al.
2019/0182415 A1*   6/2019 Sivan ...................... G06F 3/013
2019/0187253 A1*   6/2019 Ghosh .................... G06N 3/084

FOREIGN PATENT DOCUMENTS

JP          2018-084982        5/2018
JP          2018-206382        12/2018

* cited by examiner

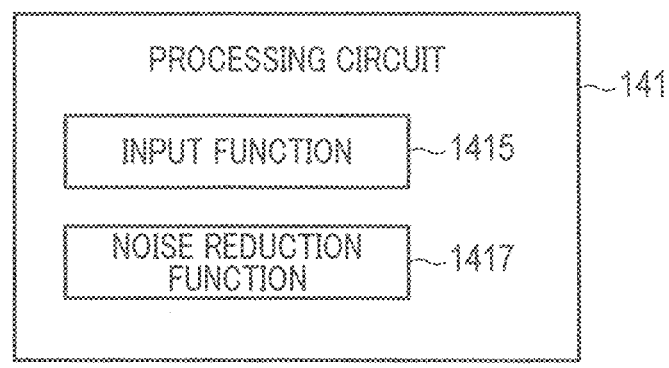
F I G. 1
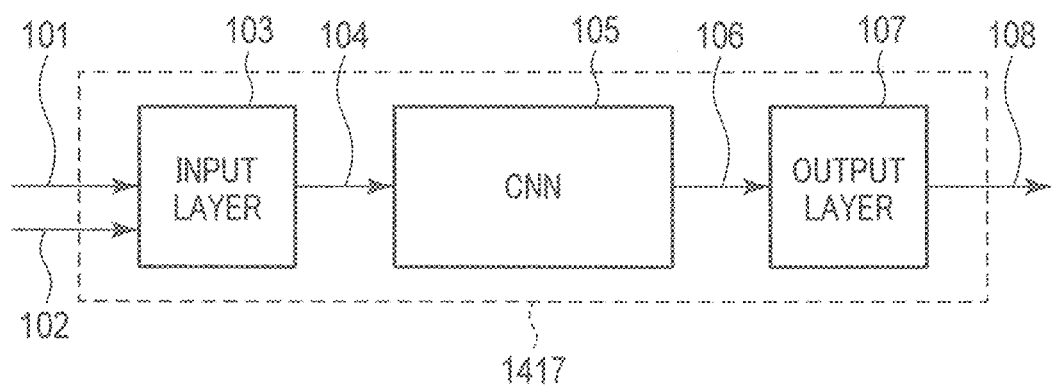
F I G. 2

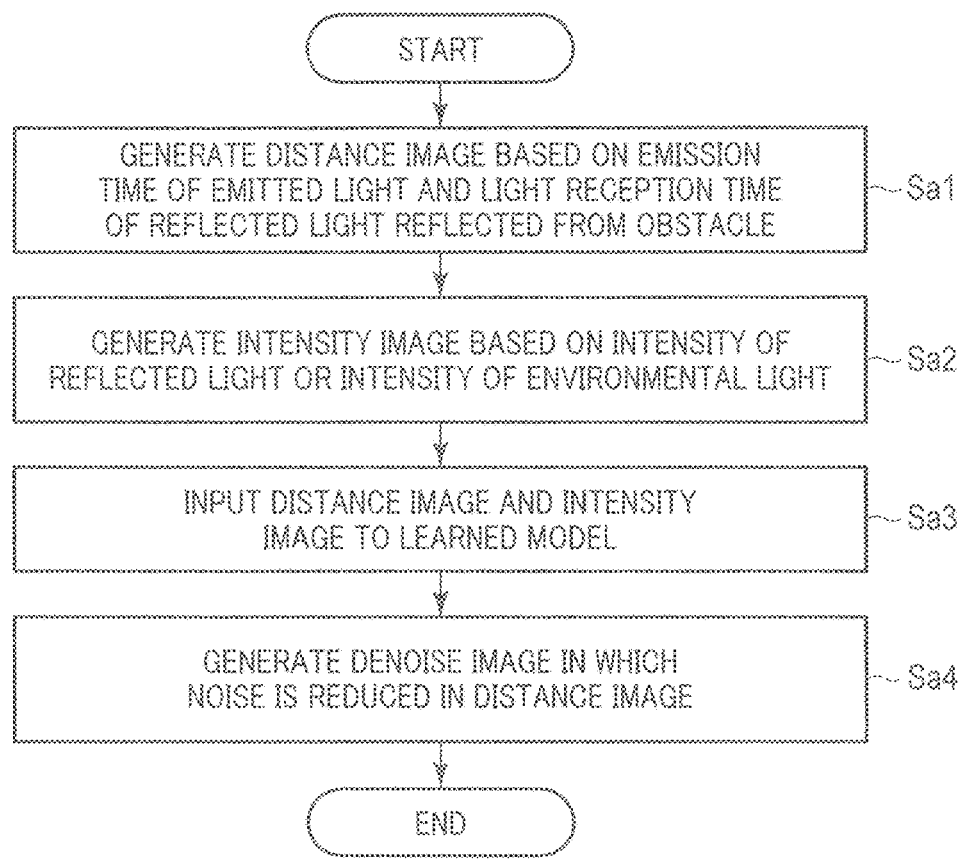
F I G. 11
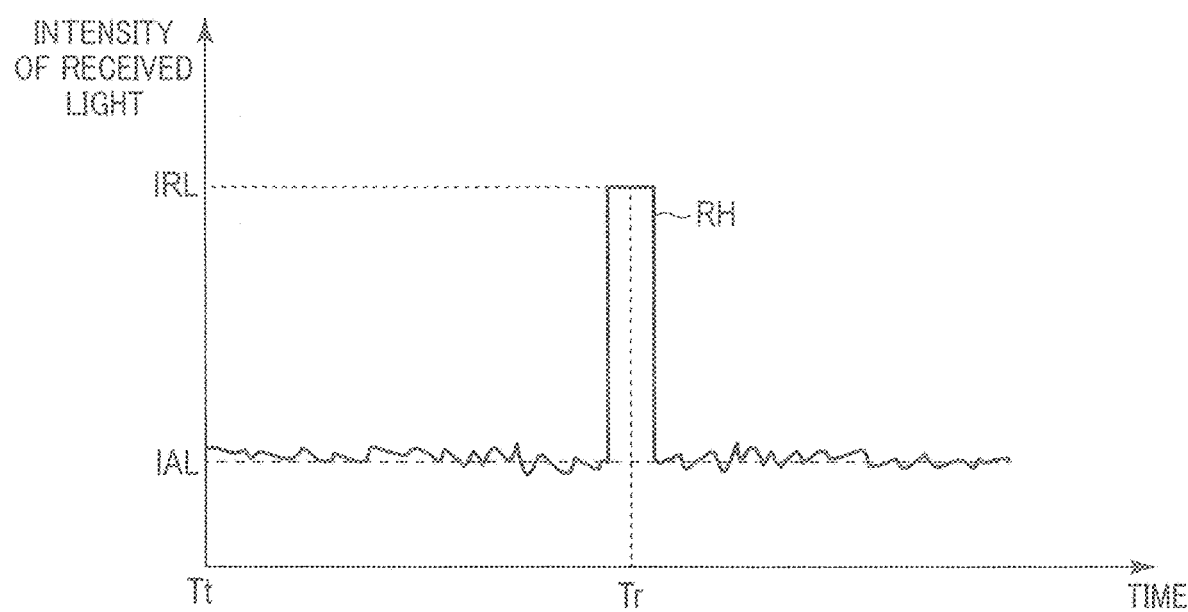
F I G. 12

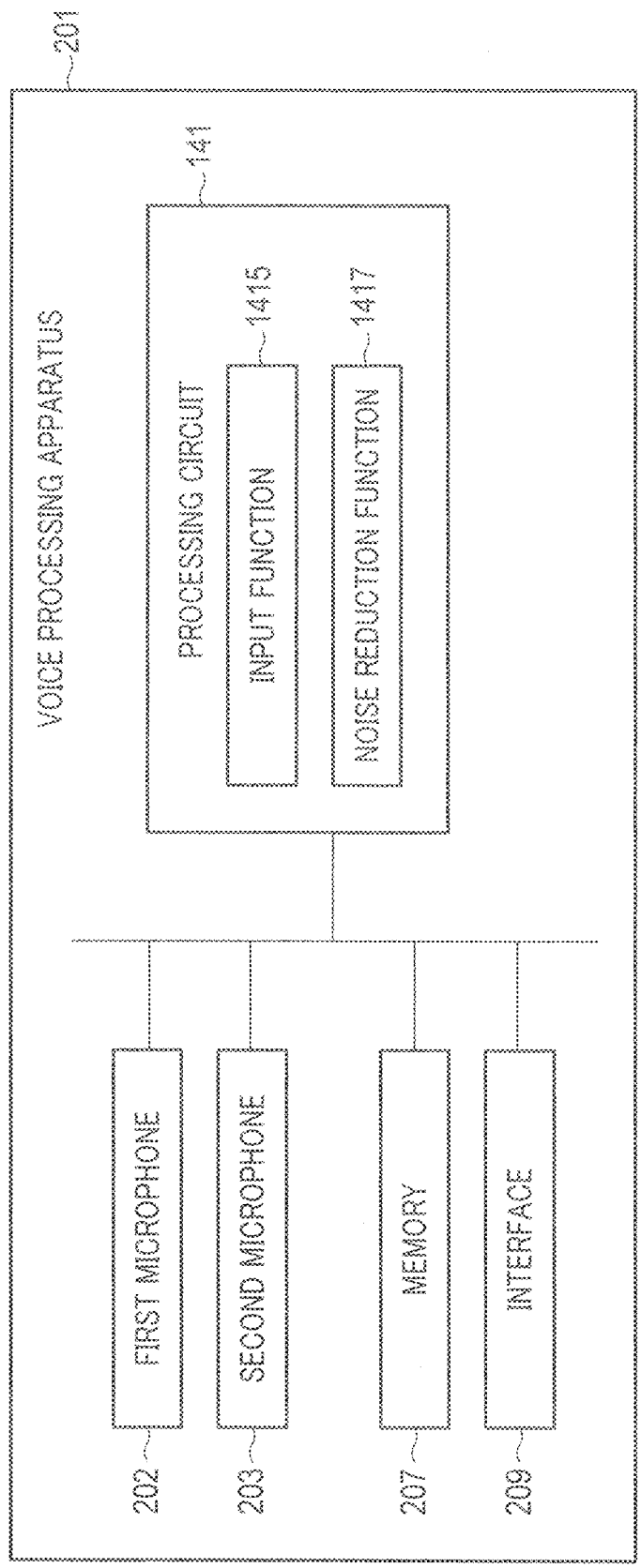
F I G. 17

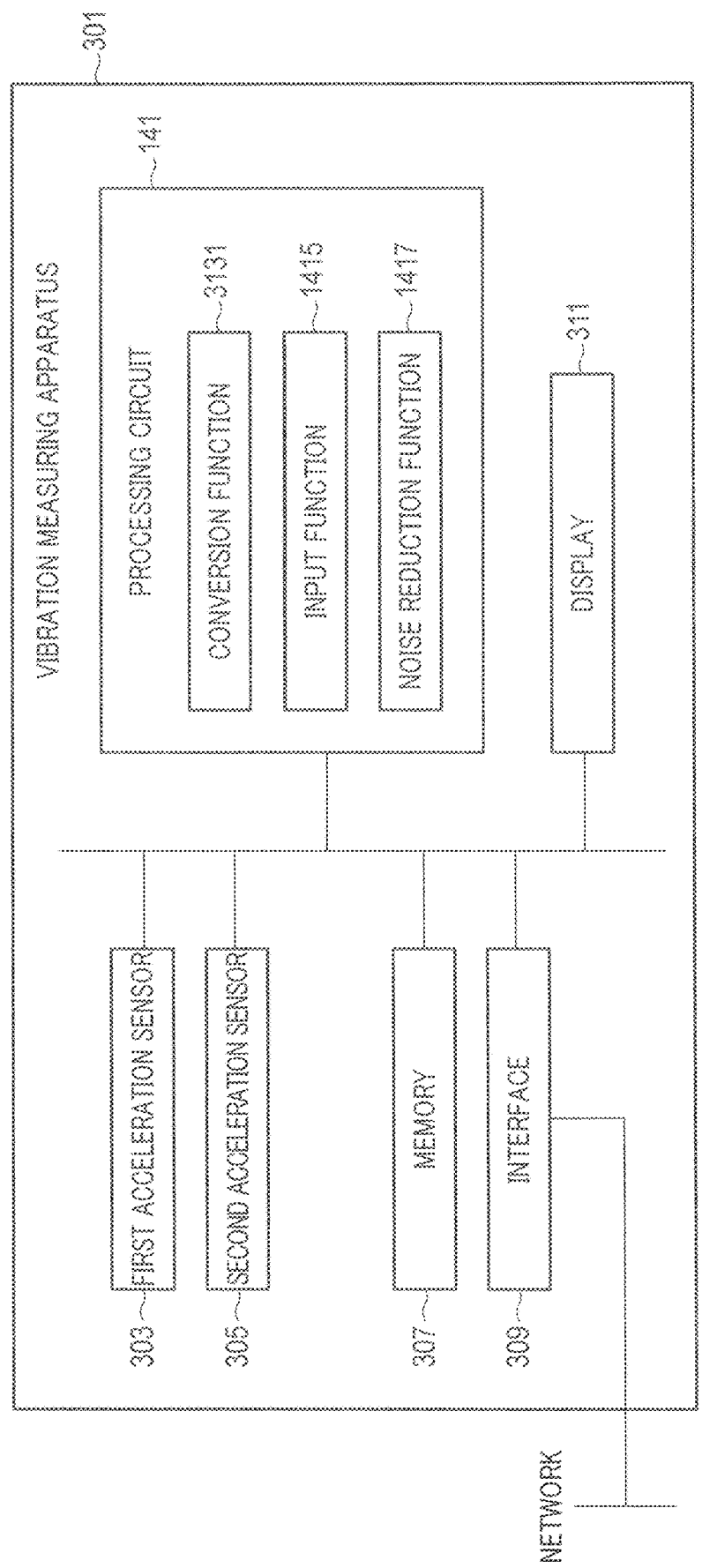
F I G. 21

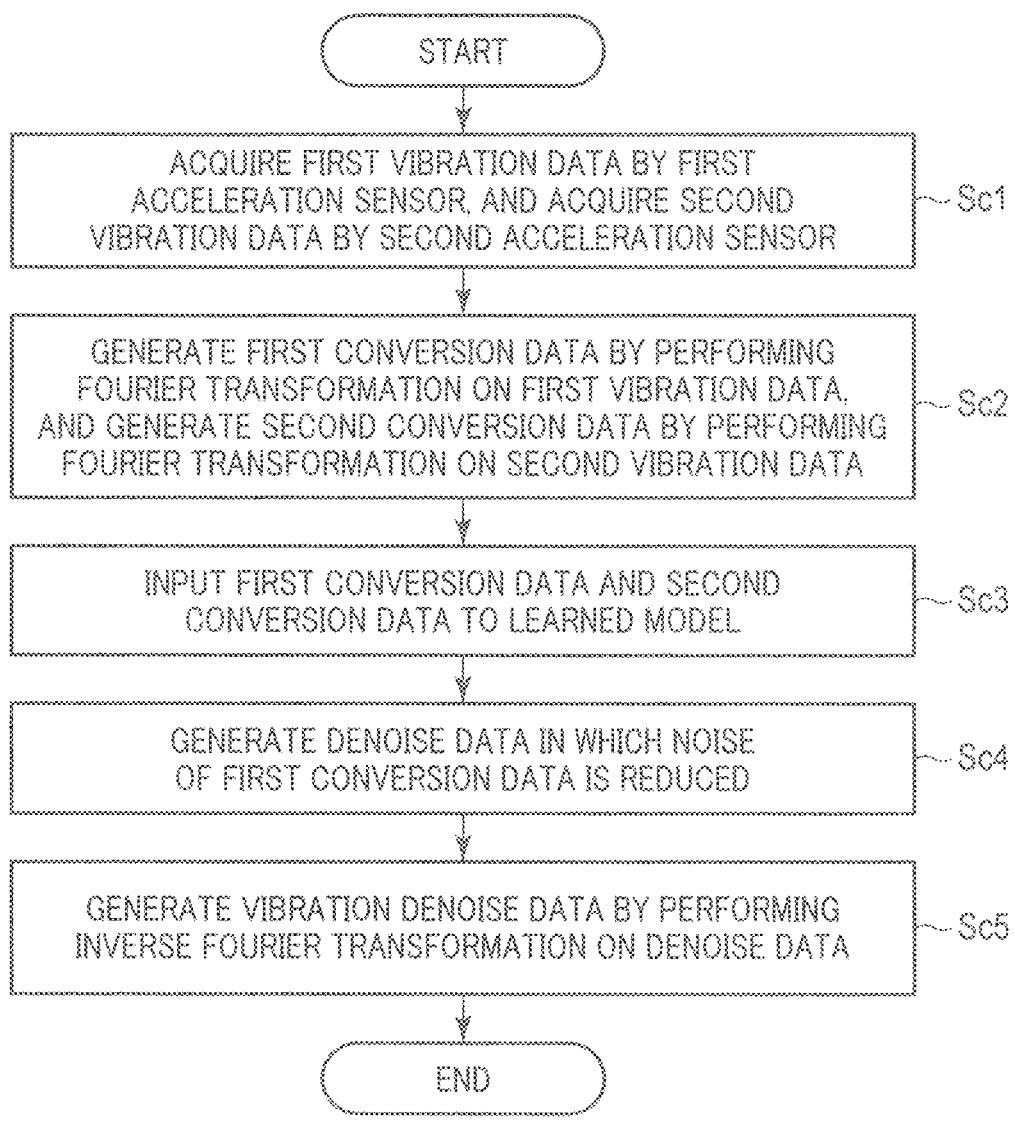
F I G. 22

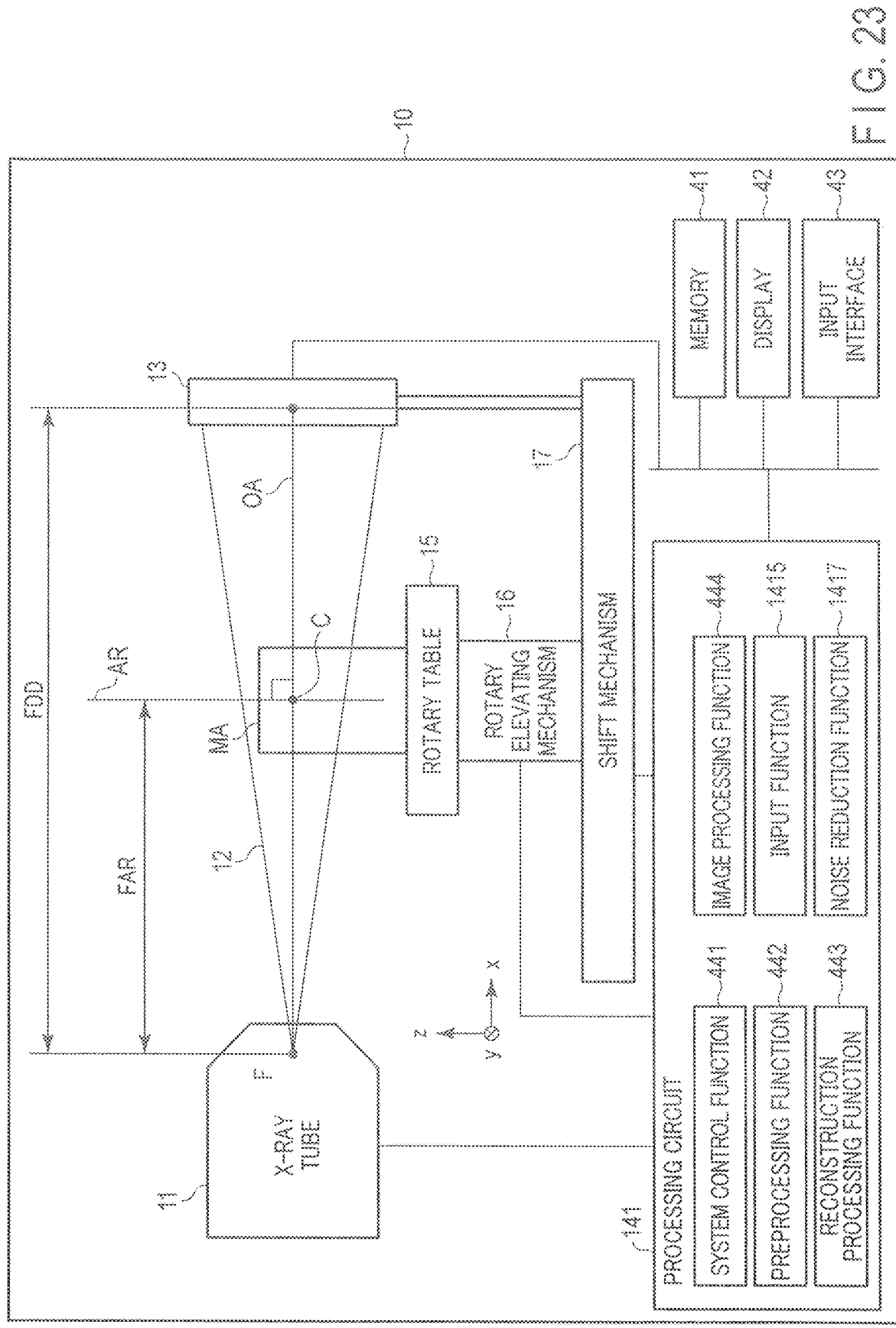
F I G. 23

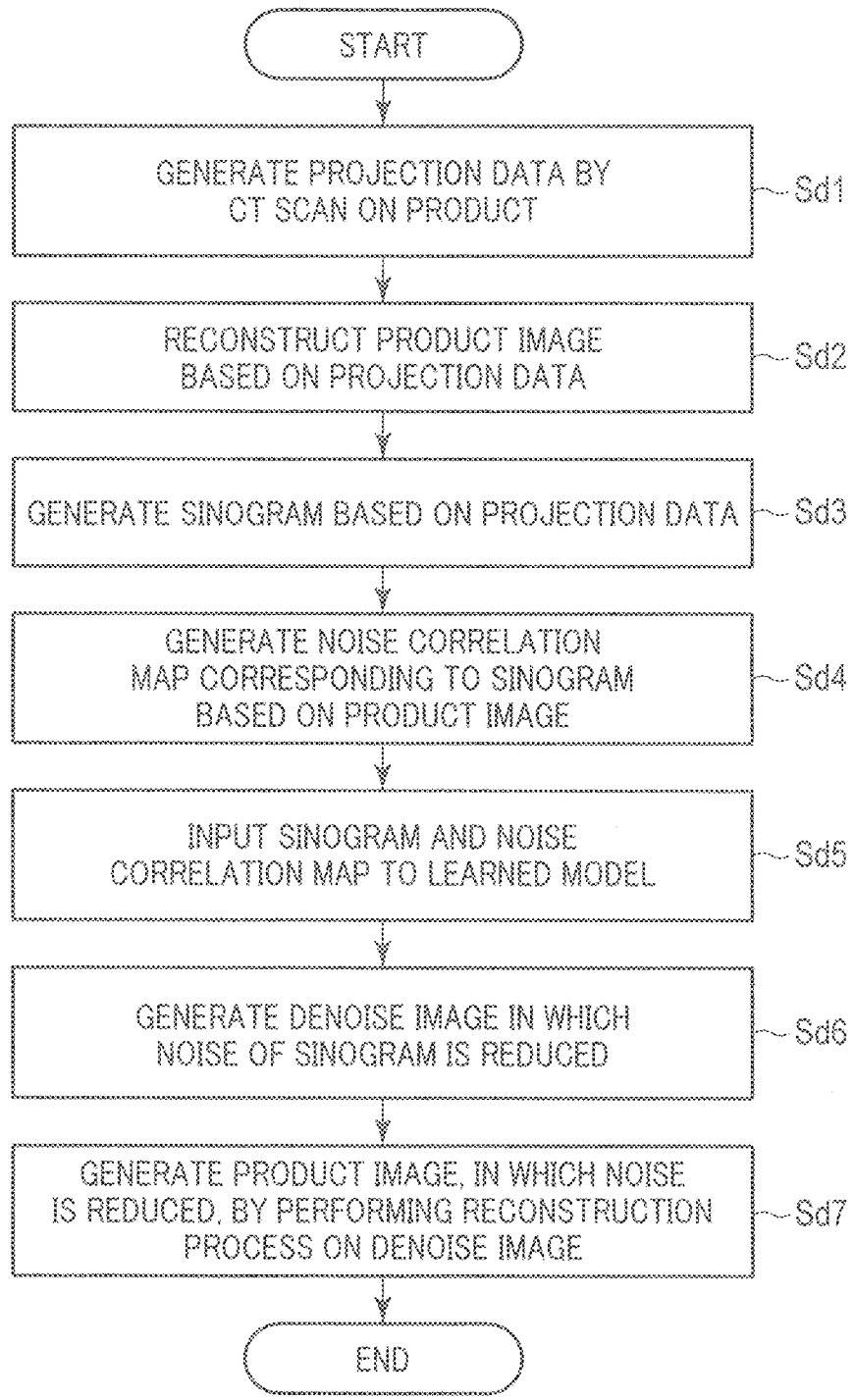
F I G. 24

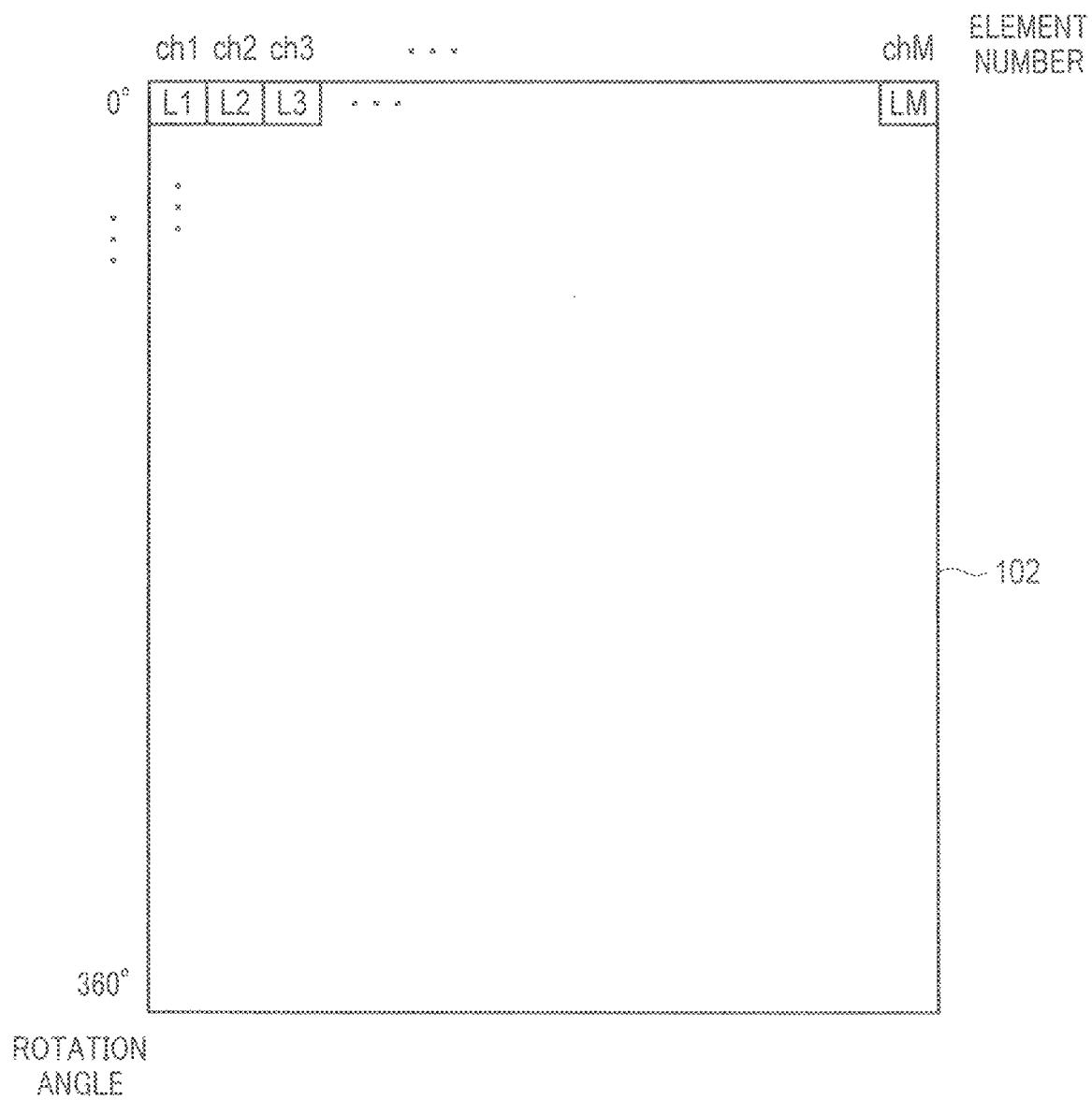
F I G. 27

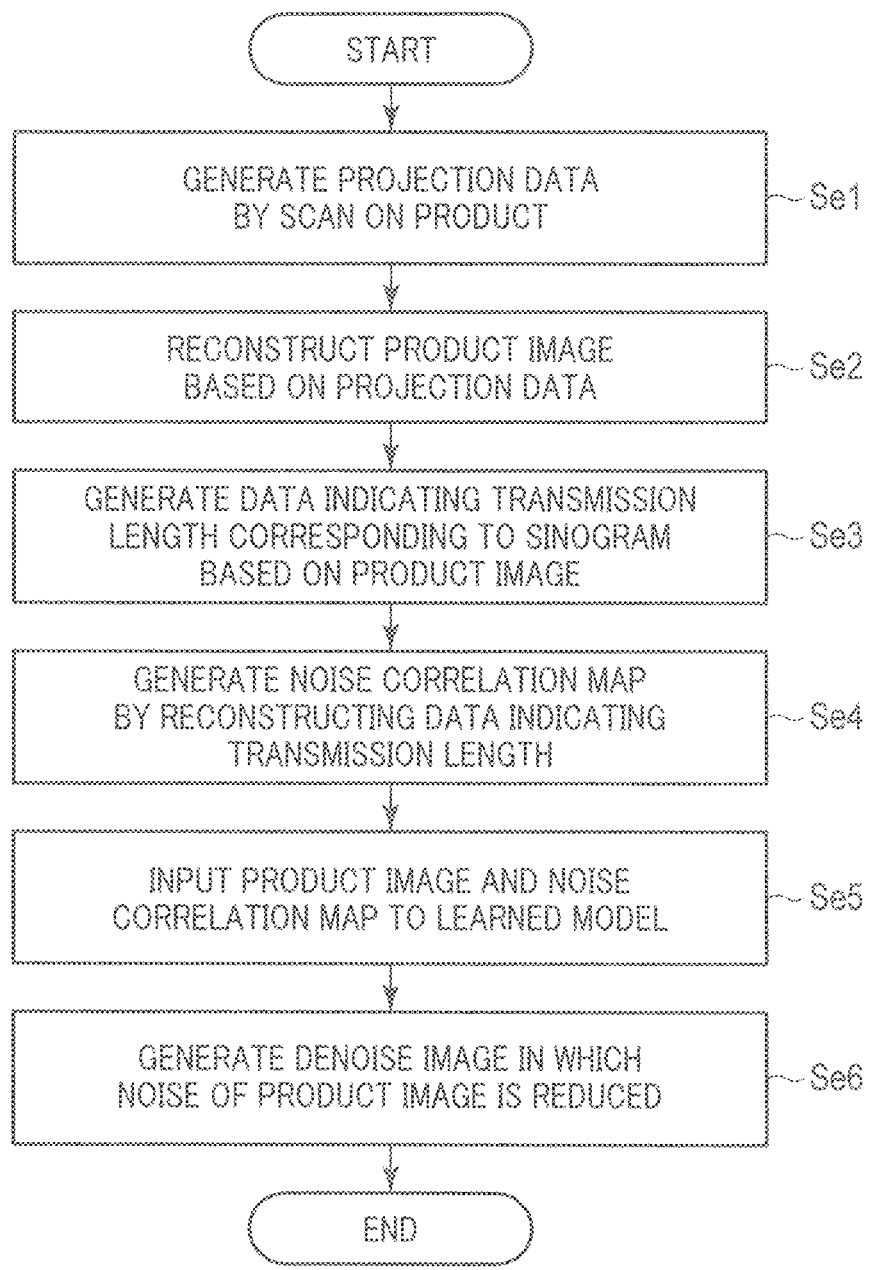
F I G. 28

DISTANCE MEASURING APPARATUS, VIBRATION MEASURING APPARATUS, AND INDUSTRIAL COMPUTED TOMOGRAPHY APPARATUS

CROSS-REFERENCE TO RELATED APPLICATIONS

This application is based upon and claims the benefit of priority from the prior Japanese Patent Applications No. 2018-109559, filed Jun. 7, 2018; the entire contents of which are incorporated herein by reference.

FIELD

Embodiments described herein relate generally to a distance measuring apparatus, a vibration measuring apparatus, and an industrial computed tomography apparatus.

BACKGROUND

Noise included in images acquired by capturing photographs or videos causes various adverse effects such as deterioration in appearance when printed or displayed on a display, deterioration in visibility in security cameras or the like, and reduction in recognition rate in various image recognition apparatuses. Therefore, it is preferable to remove noise before image display or the like.

Noise removal by the image processing is basically realized by suppressing the amplitude of noise through smoothing. At this time, for example, a complicated technique applied to image pattern may be performed so that an original edge of an image signal (portion where luminance sharply changes) or a texture (fine pattern) is not blurred together with noise. On the other hand, in recent years, an image noise removal method using a simple convolution neural network (hereinafter referred to as CNN) has been proposed as having high signal restoration accuracy.

However, in the image noise removal method using the CNN, since smoothing strength cannot be controlled, the same process is performed on the entire screen. Therefore, for example, noise remains in regions with much noise such as dark portions of the photograph, and an original signal may also be smoothed in regions with less noise such as bright portions of the photograph. That is, in the CNN, since convolution is performed using the same weighting factor over the entire region of the input image, noise remains in the region having more noise than noise assumed at the time of learning in the image output from the CNN, and an original pixel value is also smoothed in a region having less noise than noise assumed at the time of learning. However, when the CNN is learned using a wide range of noise amount, there is a problem that the accuracy of noise reduction in images is deteriorated.

BRIEF DESCRIPTION OF THE DRAWINGS

FIG. 1 is a block diagram illustrating a configuration example of a processing circuit mounted on a distance measuring apparatus, a voice processing apparatus, vibration measuring apparatus, or an industrial CT apparatus according to the present embodiment;

FIG. 2 is a diagram illustrating an example of an outline of a learned model performed in a noise reduction function in the present embodiment;

FIG. 11 is a flowchart showing an example of a procedure of a denoise process in the first application example of the present embodiment;

FIG. 12 is a diagram illustrating an example of the intensity of a reflected light signal and the intensity of an environmental light signal with respect to time in a light detecting element in the first application example of the present embodiment;

FIG. 17 is a diagram illustrating an example of a configuration of a voice processing apparatus in a second application example of the present embodiment;

FIG. 21 is a diagram illustrating an example of a configuration of a vibration measuring apparatus in a third application example of the present embodiment;

FIG. 22 is a flowchart showing an example of a procedure of a denoise process in the third application example of the present embodiment;

FIG. 23 is a diagram illustrating an example of a configuration of an industrial CT apparatus in a fourth application example of the present embodiment;

FIG. 24 is a flowchart showing an example of a procedure of a denoise process in the fourth application example of the present embodiment;

FIG. 27 is a diagram illustrating an example of a transmission length map in the fourth application example of the present embodiment; and FIG. 28 is a flowchart showing an example of a procedure of a denoise process in a modification of the fourth application example of the present embodiment.

DETAILED DESCRIPTION

Figure 3:
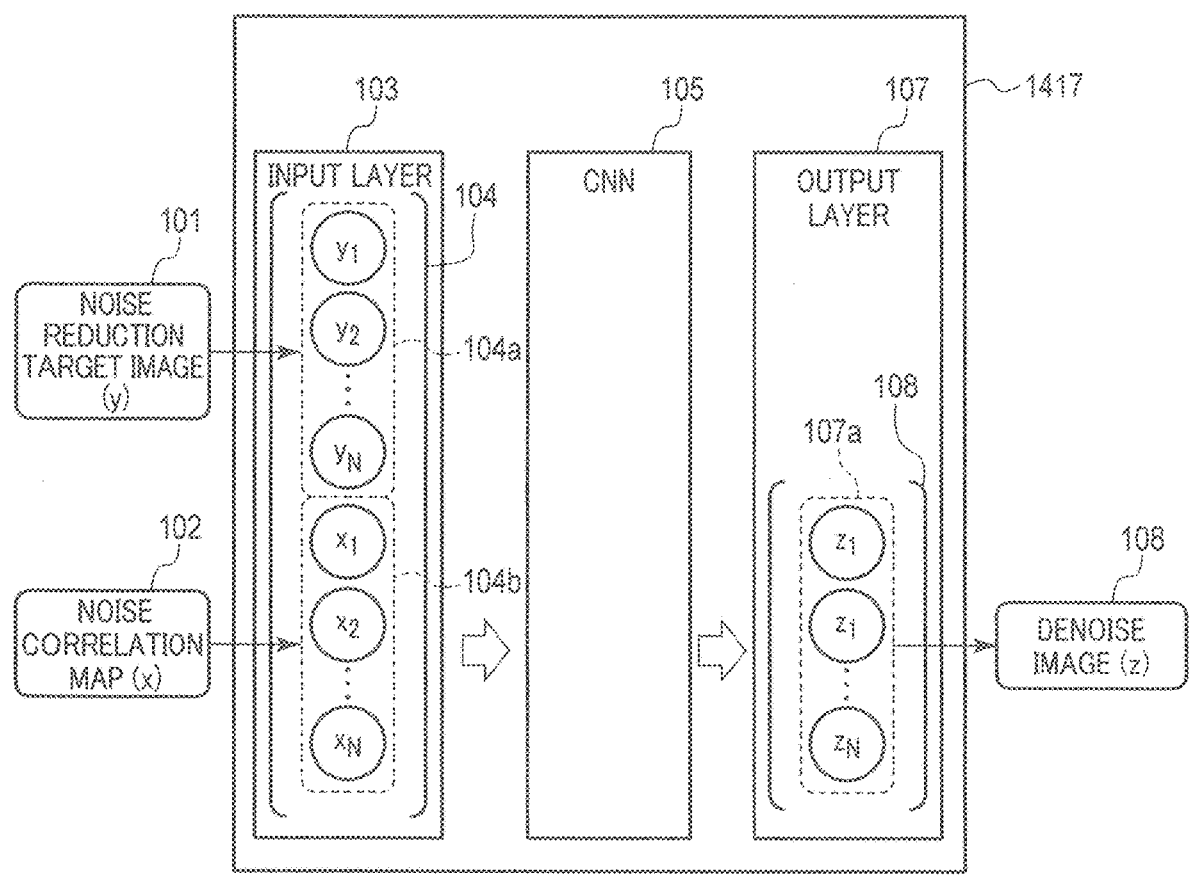
FIG. 3 is a diagram illustrating an example of combination data in an input layer and an output vector generated in an output layer in the present embodiment.

According to one embodiment, a distance measuring apparatus includes a processing circuit and a memory. The processing circuit generates a distance image by measuring distances to an obstacle by using the time until the emitted light is reflected from the obstacle and returned as reflected light. The processing circuit generates an intensity image by measuring the intensity of the reflected light or the intensity of the environmental light. The memory stores a learned model for generating a denoise image, in which noise of the distance image is reduced, based on the distance image and the intensity image. The processing circuit inputs the distance image and the intensity image to the learned model. The processing circuit generates the denoise image by using the learned model.

An object is to provide a distance measuring apparatus, a vibration measuring apparatus, and an industrial computed tomography apparatus, which are capable of improving the accuracy of noise reduction.

Hereinafter, the present embodiment will be described with reference to the drawings. In the following description, elements having substantially the same configuration are denoted by the same reference numerals, and redundant descriptions thereof are given only when necessary.

FIG. 1 is a block diagram illustrating a configuration example of a processing circuit 141 mounted on a distance measuring apparatus, a voice processing apparatus, a vibration measuring apparatus, or an industrial X-ray computed tomography (CT) apparatus according to the present embodiment. A case where the present embodiment is realized by these apparatuses will be described later as an application example.

The processing circuit 141 includes a processor (not illustrated) and a memory such as read only memory (ROM) or random access memory (RAM) as hardware resources. The processing circuit 141 has an input function 1415 and a noise reduction function 1417. Various functions performed by the input function 1415 and the noise reduction function 1417 are stored in various storage circuits such as a storage apparatus (not illustrated) or a memory in the form of programs that are executable by a computer. The processing circuit 141 is a processor that realizes functions corresponding to the respective programs by reading programs corresponding to these various functions from the storage circuit and executing the read programs. In other words, the processing circuit 141 in a state in which each program is read has the respective functions illustrated in the processing circuit 141 of FIG. 1. The input function 1415 and the noise reduction function 1417 of the processing circuit 141 are examples of an input unit and a noise reduction unit, respectively.

The term "processor" used in the above description may refer to, for example, a circuit such as a central processing unit (CPU), a micro processing unit (MPU), a graphic processing unit (GPU), an application specific integrated circuit (ASIC), a programmable logic device (for example, a simple programmable logic device (SPLD), a complex programmable logic device (CPLD), or a field programmable gate array (FPGA).

The processor realizes the function by reading the program stored in the memory circuit and executing the read program. Instead of storing the program in the memory circuit, the program may be directly embedded in the circuit of the processor. In this case, the processor realizes the function by reading the program embedded in the circuit and executing the read program.

Hereinafter, the input function 1415 and the noise reduction function 1417 executed in the processing circuit 141 will be described with reference to FIGS. 2 to 5.

FIG. 2 is a diagram illustrating an example of an outline of a learned model 105 performed in the noise reduction function 1417. The learned model 105 is a learned machine learning model of a forward propagation network learned from many learning data. The learned model 105 is, for example, a deep neural network (hereinafter referred to as DNN). In the following, for the sake of concrete explanation, explanation will be given taking as an example a convolution neural network (hereinafter referred to as CNN) as a DNN. The learned model 105 is stored in various storage circuits such as a storage apparatus (not illustrated) and a memory. Note that the learned model 105 is not limited to the DNN and the CNN, and may be other machine learning models. Note that the CNN 105 illustrated in FIG. 2 may include an input layer 103 and an output layer 107. The CNN 105 has a plurality of intermediate layers. Hereinafter, for simplicity of explanation, the CNN 105 will be described as having three intermediate layers. Note that the number of intermediate layers in the CNN 105 is not limited to three, and can be arbitrarily set before CNN learning.

As illustrated in FIG. 2, the process performed in the noise reduction function 1417 has a process in the input layer 103, a process in the CNN 105, and a process in the output layer 107. In the input layer 103, the input function 1415 sets a processing target signal 101 such as a noise reduction target image and a reference signal 102 such as a noise correlation map correlated with a spatial distribution of noise amount in the processing target signal 101. Hereinafter, for the sake of concrete explanation, noise reduction of image will be described as an example. At this time, the processing target signal 101 corresponds to the noise reduction target image, and the reference signal 102 corresponds to the image showing the noise correlation map.

When the amount of noise in the noise reduction target image 101 is known, each of a plurality of pixel values in the noise correlation map corresponds to local dispersion or standard deviation of noise. In addition, when contrast correction of different characteristics is performed for each partial region of the image with respect to the noise reduction target image 101, each of the pixel values in the noise correlation map 102 corresponds to a correction value in contrast correction.

The input layer 103 outputs, to the CNN 105, data (hereinafter referred to as combination data) 104 obtained by combining the noise reduction target image 101 and the noise correlation map 102. The CNN 105 recursively repeats the conversion of the combination data 104, that is, performs the forward propagation process by using the combination data 104 as the input and outputs the converted signal 106 to the output layer 107. Using the converted signal 106, the output layer 107 outputs a signal (hereinafter referred to as a denoise image) 108 in which the noise of the noise reduction target image 101 is reduced.

Specifically, the processing circuit 141 inputs the noise reduction target image 101 and the noise correlation map 102 to the input layer 103 by the input function 1415. That is, the processing circuit 141 inputs the noise reduction target image 101 and the noise correlation map 102 to different channels of the input layer 103. FIG. 3 is a diagram illustrating an example of the combination data 104 in the input layer 103 and the output vector 107a generated in the output layer 107. In FIG. 3, the combination data 104 is shown as the input vector. Note that the combination data 104 is not limited to the vector format, and may be, for example, a matrix format. For the sake of concrete explanation, it is assumed that the total number of pixels in the noise reduction target image 101 and the noise correlation map 102 is N (N is a natural number).

The processing circuit 141 generates the combination data 104 by combining a plurality of pixel values in the noise reduction target image 101 and a plurality of pixel values in the noise correlation map 102 in the input layer 103 by the noise reduction function 1417. Specifically, the processing circuit 141 allocates a plurality of pixel values ($y_1$, $y_2$, ..., $y_N$) in the noise reduction target image to a first input range 104a in the input vector 104. In addition, the processing circuit 141 allocates a plurality of pixel values ($x_1$, $x_2$, ..., $x_N$) in the noise correlation map 102 to a second input range 104b in the input vector 104. The processing circuit 141 outputs the input vector 104 to the CNN 105. When outputting from the input layer 103 to the CNN 105, the processing circuit 141 performs a convolution process on the input vector 104. The processing circuit 141 recursively performs a convolution process in the CNN 105. The convolution process and the like will be described in detail later with reference to FIG. 4. Note that when the number of pixels in the noise reduction target image 101 is different from the number of pixels in the noise correlation map, the processing circuit 141 appropriately adjusts the number of pixels in the noise correlation map 102 to the number of pixels in the noise reduction target image by an existing method.

The processing circuit 141 holds the signal 106 output from the CNN 105 by the noise reduction function 1417 as the vector format 107a indicating pixel values ($z_1$, $z_2$, ..., $z_N$) of the denoise image 108 in the output layer 107. The processing circuit 141 generates the denoise image 108 by rearranging a plurality of components in the vector format 107a as the pixels. The processing circuit 141 outputs the denoise image 108 to the storage apparatus or the like.

Figure 4:
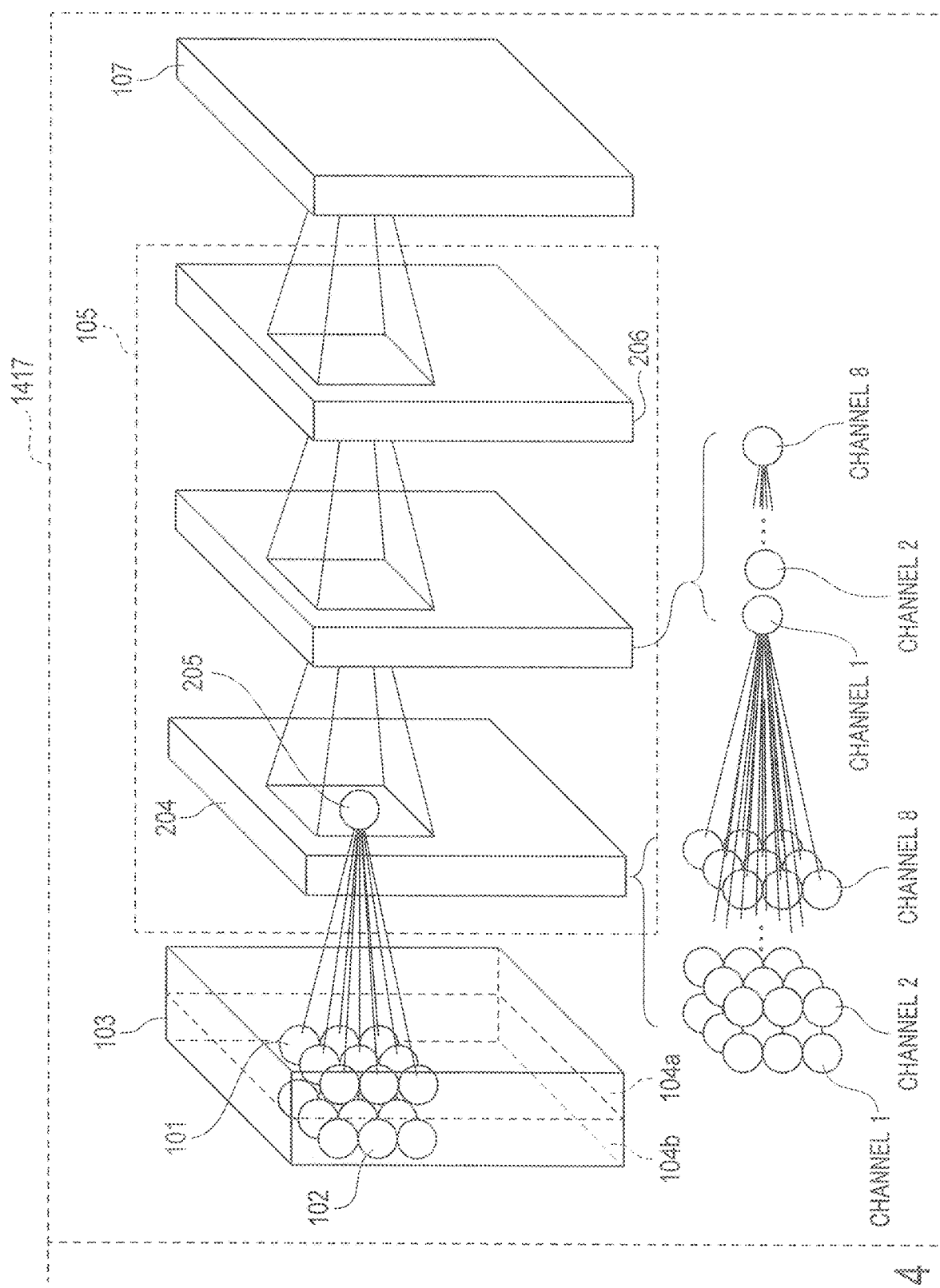
FIG. 4 is a diagram illustrating an example of a configuration of a convolution neural network (CNN) in the present embodiment.

FIG. 4 is a diagram illustrating an example of the configuration of the CNN 105. In FIG. 4, the input layer 103, the CNN 105, the first intermediate layer 204, and the output layer 107 are illustrated as perspective views for convenience of explanation. First, the processing circuit 141 sets the pixel values of the noise reduction target image to a plurality of nodes included in the first input range 104a in the input layer 103 by the noise reduction function 1417. In addition, the processing circuit 141 sets the pixel values of the noise correlation map 102 to a plurality of nodes included in the second input range 104b in the input layer 103. In FIG. 4, a plurality of nodes other than circles indicating nine nodes in each of the first input range 104a and the second input range 104b are omitted for clarity. The nodes in the first input range 104a and the second input range 104b are prepared by the number of pixels of the noise reduction target image.

Next, the processing circuit 141 performs a convolution process on the noise reduction target image 101 and the noise correlation map 102 by using a filter having a plurality of learned weighting coefficients by the noise reduction function 1417. The processing circuit 141 generates data to be input from the input layer 103 to the first intermediate layer 204 by the convolution process. The total number of weighting coefficients (hereinafter referred to as taps) in the filter is smaller than the number of pixels to which the filter is applied. For example, in the input layer 103 of FIG. 4, the tap is 18 since the number of pixels to which the filter is applied is 3 pixels (horizontal)×3 pixels (vertical)×2 images (noise reduction target image 101 and noise correlation map 102). Note that the tap is not limited to 18 as illustrated in FIG. 4, and may be set as appropriate at the time of learning.

The processing circuit 141 performs a product-sum operation for nine pixels in the noise reduction target image 101 and nine pixels in the noise correlation map 102 by using the filter whose taps have 18 weighting coefficients by the noise reduction function 1417. In the first intermediate layer 204, the processing circuit 141 sets the result value (hereinafter referred to as the product-sum value) of the product-sum operation to the node 205 corresponding to the position of the filter used for the product-sum calculation. The processing circuit 141 sets the product-sum value for all the nodes in the first intermediate layer 204 while changing the application position of the filter to the noise reduction target image 101 and the noise correlation map 102. The number of all the nodes in the first intermediate layer 204 is the same as the total number of pixels in the noise reduction target image 101 and the noise correlation map 102. Note that the number of all the nodes may be different from the total number of pixels in the noise reduction target image 101 and the noise correlation map 102. In addition, the values of the weighting coefficients included in the filter are constant regardless of the positions of the filters applied to the noise reduction target image 101 and the noise correlation map 102.

Figure 5:
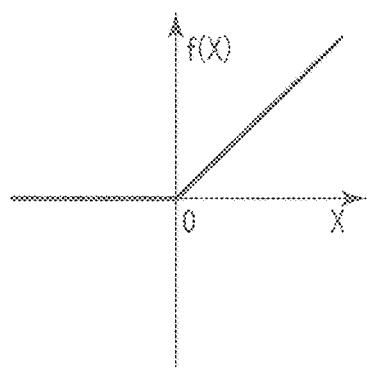
FIG. 5 is a diagram illustrating an example of an activation function according to the present embodiment.

The processing circuit 141 converts (activates) the output result from the filter, that is, the product-sum value X, by using a nonlinear function called an activation function by the noise reduction function 1417. FIG. 5 is a diagram illustrating an example of an activation function f(X). The processing circuit 141 uses a rectified linear unit (ReLU) function shown in FIG. 5 as the activation function. The activation function f(X) shown in FIG. 5 is a function that outputs 0 when X≤0 and outputs X when X>0. Note that the activation function is not limited to the ReLU function, and can be set appropriately at the time of learning by the CNN 105. Note that each of the intermediate layers in the CNN 105 may have a plurality of channels corresponding to the number of images. For example, as illustrated in FIG. 4, when the number of channels in the first intermediate layer 204 is 8, the processing circuit 141 uses eight filters of 3×3×2 taps for each channel in the conversion from the input layer 103 to the first intermediate layer 204. For the eight types of the filters, the weighting coefficients are different. Note that the taps of the filters used in each of the intermediate layers may be different.

Similarly, when the number of channels from the i-th intermediate layer (i is a natural number from 1 to (n−1) and n is the total number of the intermediate layers) to the (i+1)th intermediate layer is 8, the processing circuit 141 repeats image conversion (n−1) times by using eight filters of 3×3×8 taps and the activation function by the noise reduction function 1417. For example, as illustrated in FIG. 4, when the total number of intermediate layers is 3, the processing circuit 141 performs the conversion of the product-sum value from the intermediate layer to the intermediate layer twice.

The number of channels of the output layer 107 is set to 1 at the time of learning. For example, in the case illustrated in FIG. 4, the processing circuit 141 performs the product-sum operation by using one filter of the 3×3×8 taps for the product-sum value of eight channels of the third intermediate layer 206 in the output layer 107 by the noise reduction function 1417. The processing circuit 141 sets the result (product-sum value) obtained by the product-sum operation to the channels of the output layer 107 as the pixel value without using the activation function. The processing circuit 141 generates the denoise image by using the pixel value set in the output layer 107.

Note that the weighting coefficients in each of the filters used in the CNN 105 are learned by a method called an error back propagation method by using many learning data before implementing the noise reduction function 1417. Specifically, the weighting coefficients are learned so that the output image obtained when the imaging containing noise (hereinafter referred to as the noise-containing image) and the noise correlation map are input is closer to the denoise image. Each of many learning data is generated by, for example, the following procedure. First, the image without noise (hereinafter referred to as the non-noise image) and the noise correlation map 102 are prepared. Next, Gaussian noise having the pixel value of the noise correlation map 102 as the standard deviation is added to a plurality of pixel values in the non-noise image to generate a noise-containing image. The non-noise image, the noise correlation map 102, and the noise-containing image are generated as a set of learning data.

Note that, in addition to the configuration of FIG. 4, the processing circuit 141 in the present embodiment may perform a process called batch normalization after convolution in the intermediate layer. In addition, the processing circuit 141 may generate the denoise image by outputting the noise image, instead of outputting the denoise image, by the noise reduction function 1417, and then subtracting the noise image from the noise reduction target image 101. At this time, the weighting coefficients are learned so that the output image at the time of inputting the noise-containing image and the noise correlation map approaches an image showing noise (hereinafter referred to as a noise image). The noise image corresponds to an image showing Gaussian noise with the pixel value of the noise correlation map as the standard deviation.

According to the processes by the above-described configuration, the following effects can be obtained.

According to the processing circuit 141 of the present embodiment, since the reference signal 102 is also input to the input layer 103 in addition to the processing target signal 101, the degree of freedom in which the output changes according to the amount of noise is generated even with the same weighting factor from the input layer 103 toward the first intermediate layer 204 in the learning of the CNN 105. Therefore, according to the present embodiment, as compared with the case where only the noise reduction target image is input to the input layer 103, even when the amount of noise in the noise reduction target image 101 is different in each of the regions of the image, it is possible to reduce noise in the processing target signal 101 with an intensity corresponding to the amount of noise for each partial region in the processing target signal 101.

(First Modification Example)

Figure 6:
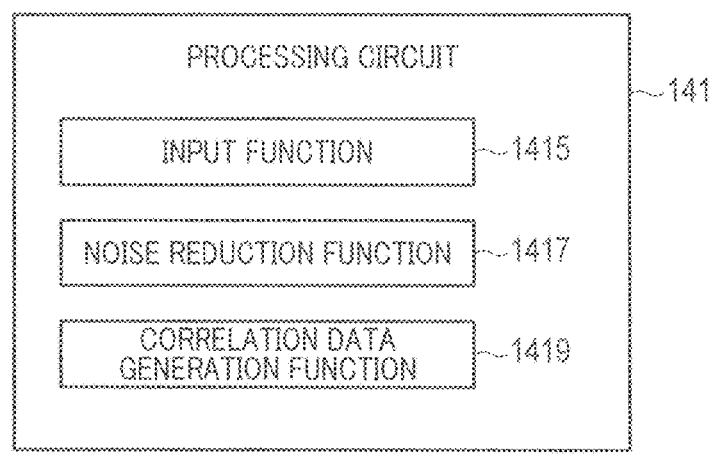
FIG. 6 is a block diagram illustrating a configuration example of a processing circuit in a first application example of the present embodiment.

A difference between the present modification example and the present embodiment is to generate the noise correlation map 102 based on the noise reduction target image 101 by using the second learned model. FIG. 6 is a block diagram showing a configuration example of the processing circuit 141 in the present modification example. The processing circuit 141 illustrated in FIG. 6 further has a correlation data generation function 1419 in addition to the various functions of the processing circuit 141 illustrated in FIG. 1. The correlation data generation function 1419 of the processing circuit 141 is an example of a correlation data generation unit.

The processing circuit 141 performs the second learned model by the correlation data generation function 1419. The second learned model is a learned machine learning model of a forward propagation network learned from many learning data. The second learned model is, for example, a CNN including an input layer, a plurality of intermediate layers, and an output layer. The second learned model is stored in various storage circuits such as a storage apparatus (not illustrated) and a memory. Note that the second learned model may be a DNN including an input layer, a plurality of intermediate layers, and an output layer. Since the second learned model in the present application example is the CNN or the DNN, detailed descriptions thereof will be omitted.

The weighting coefficients in each of the filters used in the CNN corresponding to the second learning model in the present modification example are learned by a method called an error back propagation method by using many learning data before implementing the correlation data generation function 1419. Each of many training data is used to learn a plurality of weighting coefficients by using the noise-containing image and the noise correlation map as a set of learning data. That is, the weighting coefficients are learned so that the output image at the time of inputting the noise-containing image approaches the noise correlation map.

Figure 7:
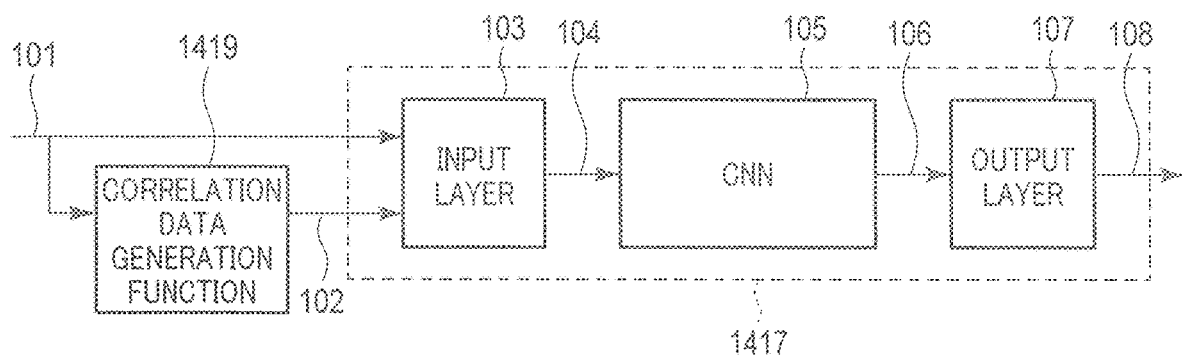
FIG. 7 is a diagram illustrating an example of data input in the first modification example of the present embodiment.

FIG. 7 is a diagram illustrating an example of data input in the present modification example. Hereinafter, a process related to the difference between the present modification example and the present embodiment will be described with reference to FIG. 7.

The processing circuit 141 inputs the noise reduction target image 101 to the input layer 103 and the input layer 103 of the second learned model in the correlation data generation function 1419 by the input function 1415. In addition, the processing circuit 141 inputs the noise correlation map 102 output from the correlation data generation function 1419 to the input layer 103.

The processing circuit 141 generates the noise correlation map 102 by performing the second learned model, to which the noise reduction target image 101 is input, by the correlation data generation function 1419. Since the processing contents of the noise reduction function 1417 are the same as those in the present embodiment, descriptions thereof will be omitted. Note that the processing of the correlation data generation function 1419 may be embedded in the noise reduction function 1417.

According to the configuration described above, the following effects can be obtained in addition to the effects of the present embodiment.

According to the processing circuit 141 of the present modification example, since the reference signal 102 can be generated from the processing target signal 101, there is no need to prepare the reference signal 102 separately from the noise reduction target image 101. That is, according to the processing circuit 141, since it is unnecessary to collect the reference signal 102, it is possible to improve the efficiency related to the denoise process of the noise reduction target image 101.

(Second Modification Example)

A difference between the present modification example and the present embodiment is that only the noise reduction target image 101 is input to the input layer 103 and the noise correlation map 102 is input to at least one intermediate layer in the CNN 105. That is, the input layer 103 in the present modification example has only the first input range 104a. In addition, in the present modification example, the intermediate layer to which the noise correlation map 102 is input has a channel to which the noise correlation map 102 is input in addition to a channel to which the product-sum value activated by the activation function is input.

Figure 8:
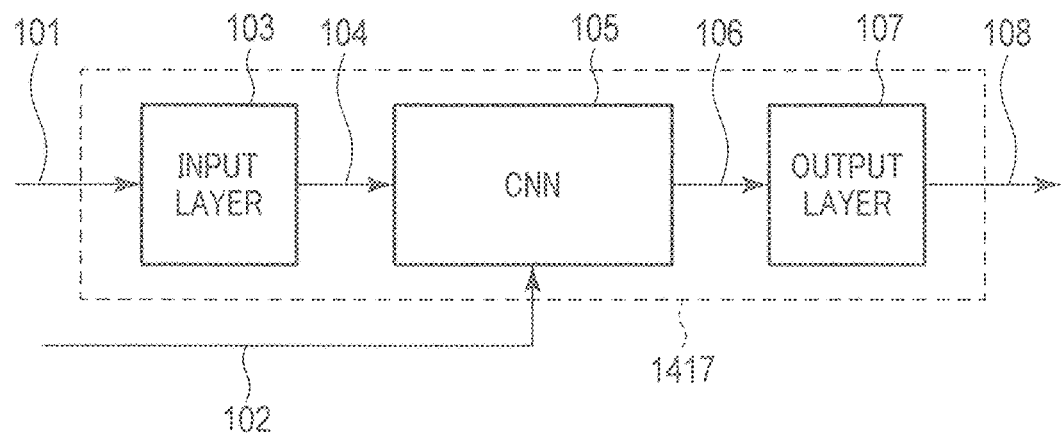
FIG. 8 is a diagram illustrating an example of data input in a second modification example of the present embodiment.

FIG. 8 is a diagram illustrating an example of data input in the present modification example. Hereinafter, a process related to the difference between the present modification example and the present embodiment will be described with reference to FIG. 8. Learning for the CNN 105 in the present modification example is the same as the present embodiment, except that the input to the input layer 103 is only the noise reduction target image 101 and the input of the noise correlation map 102 to the CNN 105 is the intermediate layer, and thus a description thereof will be omitted.

The processing circuit 141 inputs the noise reduction target image 101 to the input layer 103 by the input function 1415. The processing circuit 141 outputs the noise correlation map 102 to the intermediate layer of the CNN 105. For the sake of concrete explanation, it is assumed that the intermediate layer to which the noise correlation map 102 is input is the first intermediate layer 204. Note that the intermediate layer to which the noise correlation map 102 is input is not limited to the first intermediate layer 204, and the noise correlation map 102 may be input to any one of the intermediate layers.

Figure 9:
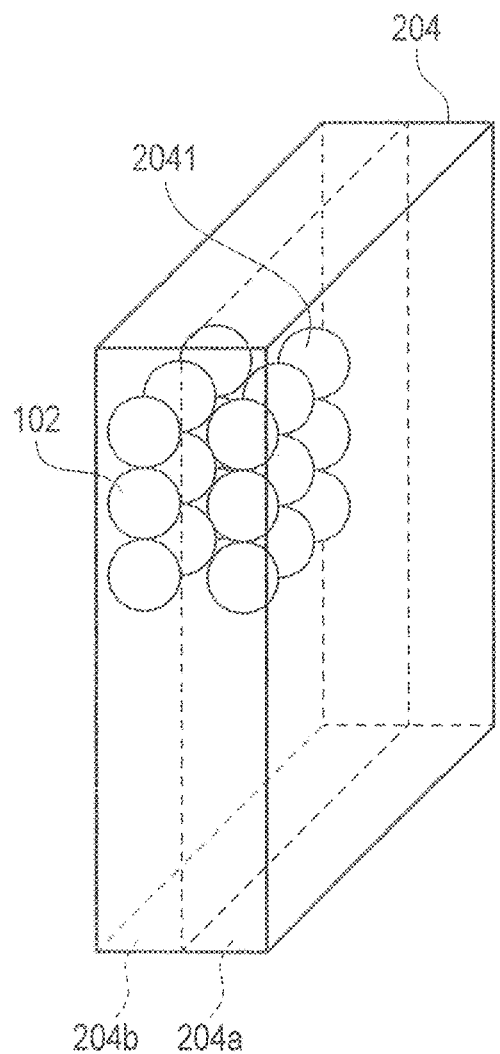
FIG. 9 is a diagram illustrating an example of a first intermediate layer to which a noise correlation map is input in the second modification example of the present embodiment.

FIG. 9 is a diagram illustrating an example of the first intermediate layer 204 to which the noise correlation map 102 is input in the present modification example. As illustrated in FIG. 9, the first intermediate layer 204 includes a post-convolution input range 204a to which the convoluted and activated data 2041 is input from the input layer 103, and a map input range 204b to which the noise correlation map 102 is input. A plurality of nodes in the post-convolution input range 204a are the same as a plurality of nodes in the first input range 104a. In addition, a plurality of nodes in the map input range 204b are the same as a plurality of nodes in the second input range 104b. That is, in the present modification example, the first intermediate layer 204 has a channel to which the noise correlation map 102 is input, in addition to the channel described in the present embodiment. Therefore, the processing circuit 141 performs convolution with a tap with many taps in the channel direction as many added channels, as the output to the second intermediate layer by the noise reduction function 1417. For example, referring to FIGS. 4 and 9, the processing circuit 141 performs a convolution process by using a filter of 3×3×9 taps.

Note that the input of the noise correlation map 102 to the intermediate layer may be simply added to the convolution data, without using the channel for the noise correlation map and the map input range 204b in the above example. That is, the value of the noise correlation map corresponding to each node may be added to the value set in the input range 204a. In addition, in a case where there are two or more channels of post-convolution input ranges 204a, the noise correlation map may be input to the configuration similar to the input layer 103, and the output increased from one channel may be added to each node and each channel of the post-convolution input range 204a.

According to the above-described configuration, in the present modification example, similarly to the effect of the present embodiment, since the degree of freedom in which the output is changed according to the amount of noise is obtained in the intermediate layer to which the reference signal 102 is input, it is possible to reduce the noise of the processing target signal 101 with intensity corresponding to the amount of noise for each partial range in the processing target signal 101.

Hereinafter, the distance measuring apparatus, the voice processing apparatus, the vibration measuring apparatus, and the industrial CT apparatus each including the processing circuit 141 in the present embodiment will be respectively described in first to fourth application examples. The distance measuring apparatus and the industrial CT apparatus are an example of using the two-dimensional processing target signal 101 and the two-dimensional reference signal 102 for the CNN 105. In addition, the voice processing apparatus and the vibration measuring apparatus are an example of using the one-dimensional processing target signal 101 and the one-dimensional reference signal 102 for the CNN 105.

(First Application Example)

The distance measuring apparatus in the present application example mounts the processing circuit 141 in the present embodiment. In the distance measuring apparatus, for example, optical remote sensing technology such as a light detection and ranging (LIDAR), a light wave distance measuring apparatus, or a radio distance measuring apparatus is used. For example, in a case where the distance measuring apparatus is mounted on a vehicle, the distance measuring apparatus is used for determining the surrounding condition of the vehicle and detecting an obstacle related to the travel of the vehicle. As the intensity of reflected light in an image sensor included in the distance measuring apparatus is smaller, or as the disturbance such as environmental light other than reflected light increases, an error (noise) in a distance image generated by the distance measuring apparatus becomes large. Therefore, the accuracy of the distances in the distance image can be improved by setting the distance image as the processing target signal 101 and setting the intensity of the reflected light and the amount of environmental light acquired simultaneously with the distance image as the noise correlation map 102.

Figure 10:
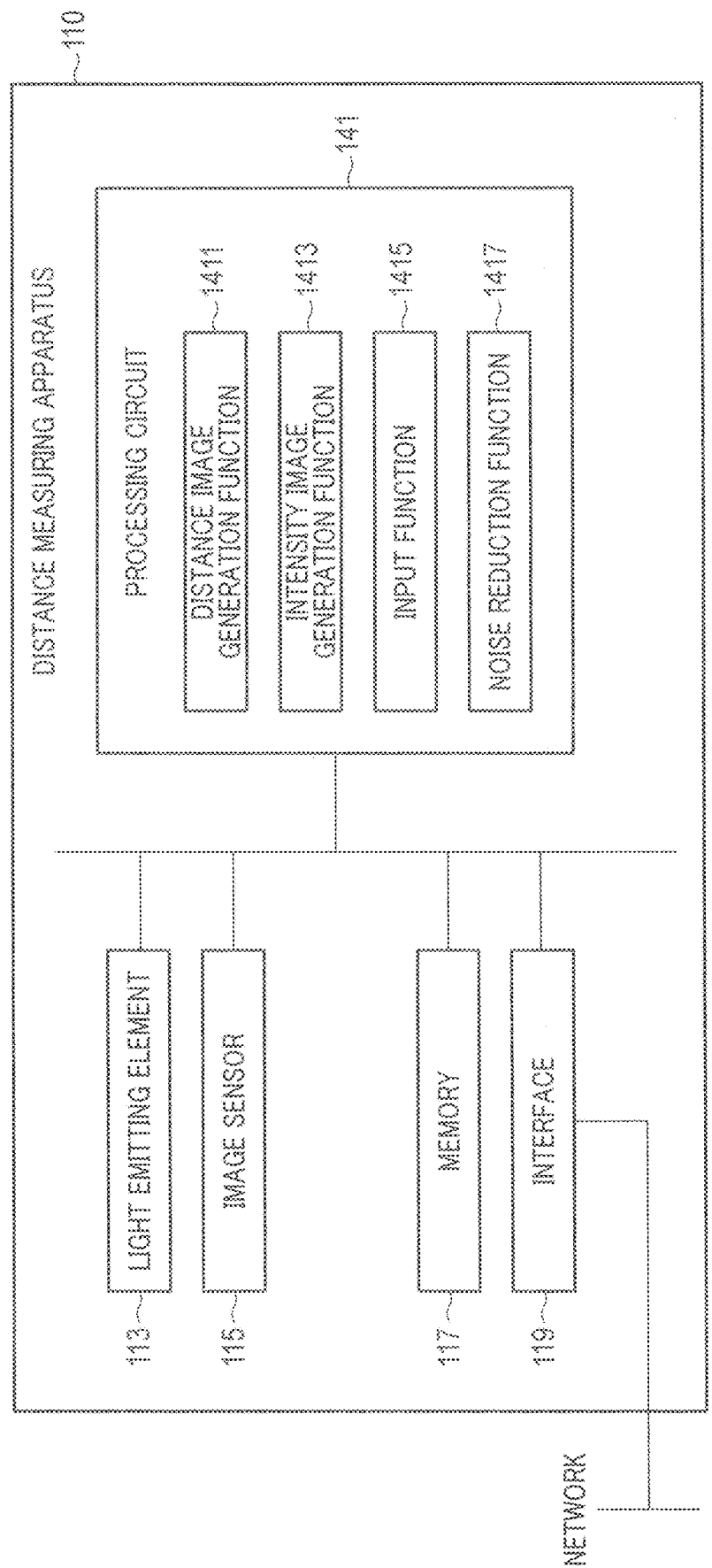
FIG. 10 is a diagram illustrating an example of a configuration of a distance measuring apparatus in the first application example of the present embodiment.

The overall configuration of the distance measuring apparatus 110 in the present application example will be described with reference to FIG. 10. FIG. 10 is a diagram illustrating an example of the configuration of the distance measuring apparatus 110. As illustrated in FIG. 10, the distance measuring apparatus 110 includes a light emitting element (irradiation unit) 113, an image sensor (light receiving unit) 115, a memory (storage unit) 117, an interface 119, and a processing circuit (processing unit) 141. As illustrated in FIG. 10, the processing circuit 141 has a distance image generation function 1411, an intensity image generation function 1413, an input function 1415, and a noise reduction function 1417. Note that the distance measuring apparatus 110 may further include an environmental light receiving element that receives environmental light, in addition to the image sensor 115. At this time, the environmental light receiving element has a resolution lower than that of, for example, the image sensor 115.

In the present application example, the noise reduction target image 101 corresponds to the distance image generated by the distance image generation function 1411 before the denoise process by the noise reduction function 1417 in FIG. 1. Each of the pixel values in the distance image has, for example, a gray scale corresponding to the distance from the distance measuring apparatus 110 to the obstacle. For example, when the distance from the distance measuring apparatus 110 to the obstacle is short, the pixel value of the distance image becomes black or dark. In addition, when the distance from the distance measuring apparatus 110 to the obstacle is long, the pixel value of the distance image becomes white or bright. In addition, the noise correlation map 102 is an image correlated with the spatial distribution of the noise amount in the distance image, and corresponds to, for example, the intensity image generated by the intensity image generation function 1413. The intensity image corresponds to, for example, an image (hereinafter referred to as reflected light intensity image) showing the spatial distribution of the intensity of the reflected light received by the image sensor 115 after the light emitted from the light emitting element 113 is reflected from an obstacle such as a structure or the like, or an image (hereinafter referred to as environmental light intensity image) showing the spatial distribution of the intensity of the environmental light received by the image sensor 115. The intensity image has a pixel value correlated with a noise amount or a blur amount with respect to the distance from the obstacle to the distance measuring apparatus 110 in each of a plurality of pixels.

In the present application example, regarding the processing contents related to the first modification example and the second modification example, since it can be understood that the noise reduction target image 101 is replaced with a distance image and the noise correlation map 102 is replaced with the intensity image, descriptions thereof will be omitted.

Note that, in the present application example, in a case where the noise correlation map 102 is generated based on the noise reduction target image 101 as described in the first modification example, the processing circuit 141 of the distance measuring apparatus 110 further includes a correlation data generation function 1419 as illustrated in FIG. 6.

The distance image generation function 1411, the intensity image generation function 1413, the input function 1415, and the noise reduction function 1417 of the processing circuit 141 are examples of a distance image generation unit, an intensity image generation unit, an input unit, and a noise reduction unit. Note that the process performed by the correlation data generation function 1419 may be performed by the noise reduction function 1417.

The light emitting element 113 corresponds to, for example, a laser diode. The light emitting element 113 generates laser light as emitted light according to a reference timing signal generated by a reference timing generation circuit (not illustrated). Therefore, the light emitting element 113 emits (irradiates) the laser light toward the obstacle with a predetermined solid angle. Note that the light emitting element 113 is not limited to the laser diode, and may be realized by a light wave generator that generates a light wave having an arbitrary wavelength.

The image sensor 115 has, for example, a plurality of photodetecting elements such as photodiodes. The image sensor 115 receives the reflected light and the environmental light. The image sensor 115 converts the received reflected light into an electric signal (hereinafter referred to as a reflected light signal) according to the intensity of the reflected light. The image sensor 115 outputs the reflected light signal to the processing circuit 141 together with the light receiving timing of the reflected light. The image sensor 115 converts the integrated value of the received light intensity over a predetermined time interval, that is, the total amount of electric charges accumulated at a predetermined time interval into an electric signal (hereinafter referred to as environmental light signal) as the intensity of the environmental light, and outputs the electric signal to the processing circuit 141. The predetermined time interval is, for example, a time interval from the generation time of the laser light in the light emitting element 113 to the reception timing of the reflected light.

The memory 117 stores the distance image generated by the distance image generation function 1411, the intensity image generated by the intensity image generation function 1413, the distance image (hereinafter referred to as a denoise image) in which the noise of the distance image is reduced by the noise reduction function 1417. The memory 117 stores the learned model (neural network) for generating the denoise image 108 based on the distance image and the intensity image. The memory 117 stores programs corresponding to various functions to be executed in the processing circuit 141. For example, the memory 117 stores a program (hereinafter referred to as a noise reduction program) for performing the CNN 105 corresponding to the above-described learned model.

The memory 117 is, for example, a semiconductor memory element such as ROM, RAM, or flash memory, a hard disk drive, a solid state drive, or an optical disk. In addition, the memory 117 may be a driving apparatus or the like that reads and writes a variety of information with a portable storage medium such as CD-ROM drive, DVD drive, or flash memory.

An interface 119 corresponds to a circuit or the like related to input and output with respect to the distance measuring apparatus 110. The interface 119 receives an input instruction from an operator. In addition, the interface 119 receives various instructions or information inputs from an external device via a wireless or wired network. In addition, the interface 119 outputs the denoise image generated by the noise reduction function 1417 to the external device or the like via the wireless or wired network. For example, regarding the external device, when the distance measuring apparatus 110 is mounted on the vehicle, the interface 119 outputs the denoise image to the control circuit or the like in the vehicle. Note that the interface 119 includes a display (not illustrated) and may be realized as a user interface. At this time, the interface 119 displays the distance image on the display.

The processing circuit 141 controls the distance measuring apparatus 110 by a system control function (not illustrated). Various functions performed by the distance image generation function 1411, the intensity image generation function 1413, the input function 1415, and the noise reduction function 1417 are stored in the memory 117 in the form of programs that are executable by a computer. The processing circuit 141 is a processor that realizes functions corresponding to the respective programs by reading programs corresponding to these various functions from the memory 117 and executing the read programs. In other words, the processing circuit 141 in a state in which each program is read has a plurality of functions illustrated in the processing circuit 141 of FIG. 10.

In FIG. 10, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The processing circuit 141 generates the distance image based on the reference timing signal and the light reception timing by the distance image generation function 1411. Specifically, the processing circuit 141 calculates the distance to the obstacle included at a predetermined solid angle by multiplying a difference between the generation time of the laser light in the light emitting element 113 and the light reception time indicating the light reception timing of the reflected light by the light speed. The processing circuit 141 generates the distance image by arranging the calculated distances for each pixel. The processing circuit 141 generates the reflected light intensity image in which the intensity of the reflected light is arranged for each pixel, based on the reflected light signal by the intensity image generation function 1413. The processing circuit 141 generates the environmental light intensity image in which the intensity of the environmental light is arranged for each pixel, based on the environmental light signal by the intensity image generation function 1413. Hereinafter, in order to avoid complication of explanation, the reflected light intensity image and the environmental light intensity image are collectively referred to as the intensity image.

The overall configuration of the distance measuring apparatus 110 in the present application example has been described. Hereinafter, the input function 1415 and the noise reduction function 1417 in the present application example will be described in detail in the following description of the denoise process.

(Denoise Process)

The denoise process in the present application example is a process of generating the denoise image 108 by executing the noise reduction program using the distance image 101 and the intensity image 102. FIG. 11 is a flowchart showing an example of a procedure related to the denoise process in the present application example.

(Step Sa1)

The distance image 101 is generated based on the emission time of the emitted light and the light reception time of the reflected light reflected from the obstacle within a solid angle. FIG. 12 is a diagram illustrating an example of the intensity of a reflected light signal and the intensity of an environmental light signal with respect to time in a light detecting element. Tt and Tr in FIG. 12 indicate the generation time of the laser light and the light reception time of the reflected light, respectively. TRL in FIG. 12 indicates the height RH of the pulse with respect to the intensity of the reflected light at the light reception time Tr. The reflected light intensity corresponds to the height RH or the pulse area of the pulse of the current output from the image sensor 115 at the light reception time Tr in FIG. 12. In addition, IAL in FIG. 12 shows the average of the received light intensity over the time interval (Tr–Tt) from the laser light generation time Tt to the light reception time Tr of the reflected light. The intensity of the environmental light may be the average IAL of the received light intensities. It is preferable that the intensity of the environmental light does not include pulses due to the reflected light. The processing circuit 141 calculates the distance by multiplying the light speed by the time interval (Tr–Tt) with respect to each of the light detecting elements by the distance image generation function 1411.

Next, the processing circuit 141 generates the distance image 101 by using the distance calculated for each light detecting element.

Figure 13:
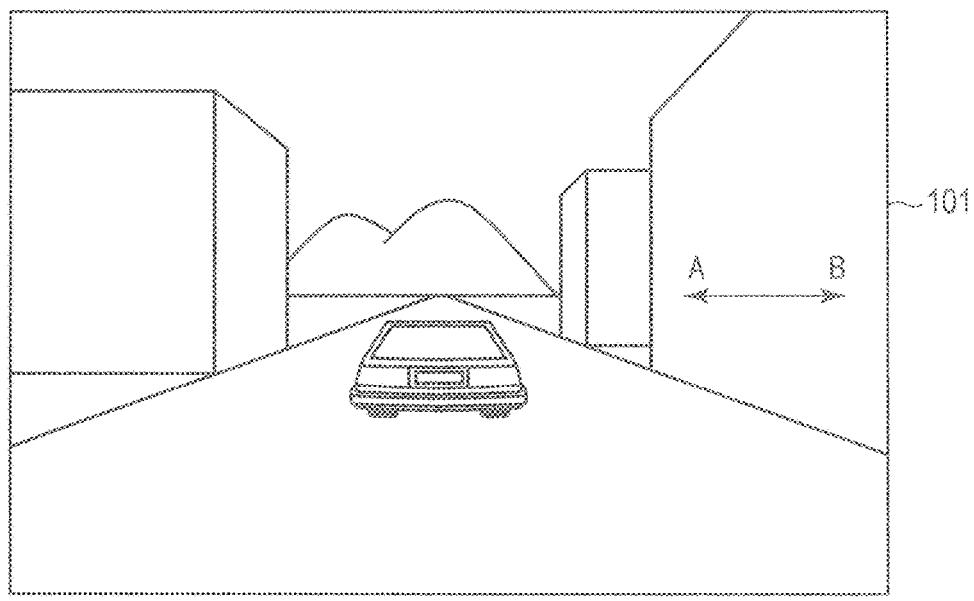
FIG. 13 is a diagram illustrating an example of a distance image generated by a distance image generation function in the first application example of the present embodiment.
Figure 14:
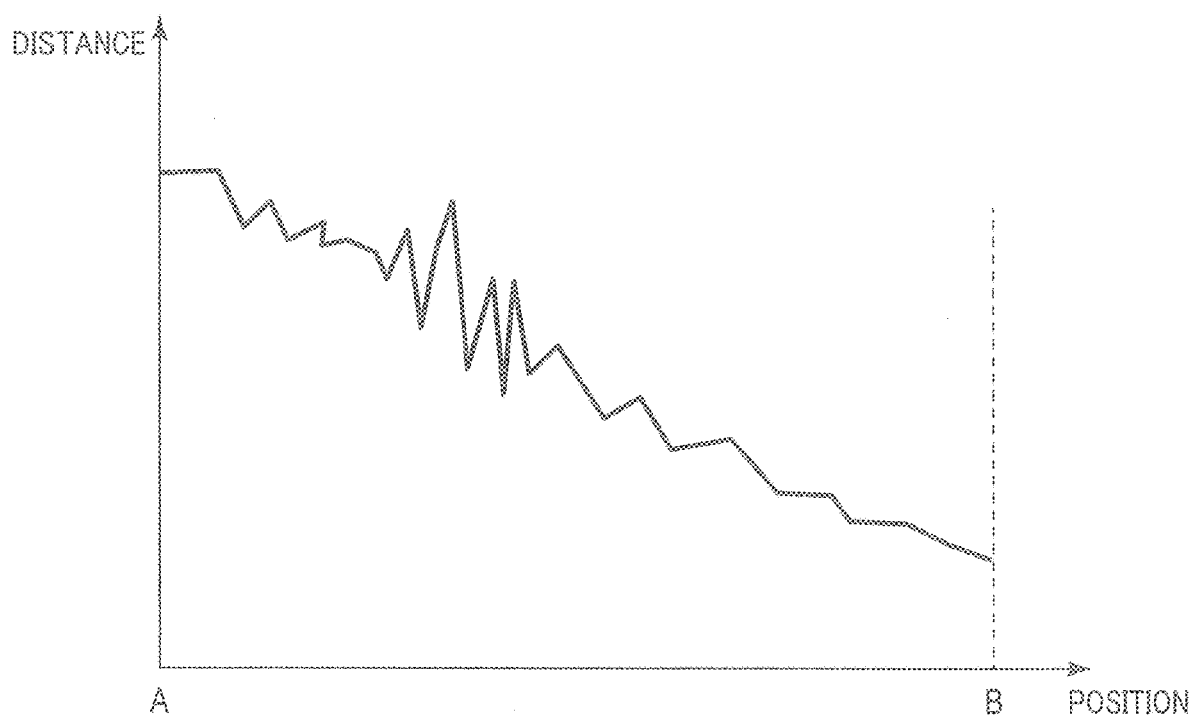
FIG. 14 is a diagram illustrating an example of a distance profile in an interval from a position A to a position B in FIG. 13 in the first application example of the present embodiment.

FIG. 13 is a diagram illustrating an example of the distance image 101 generated by the distance image generation function 1411. FIG. 14 is a diagram illustrating an example of a distance profile in an interval from a position A to a position B in FIG. 13. As illustrated in FIG. 14, the distance does not monotonously decrease from the position A to the position B, but sawtooth-shaped noise appears.

(Step Sa2)

Figure 15:
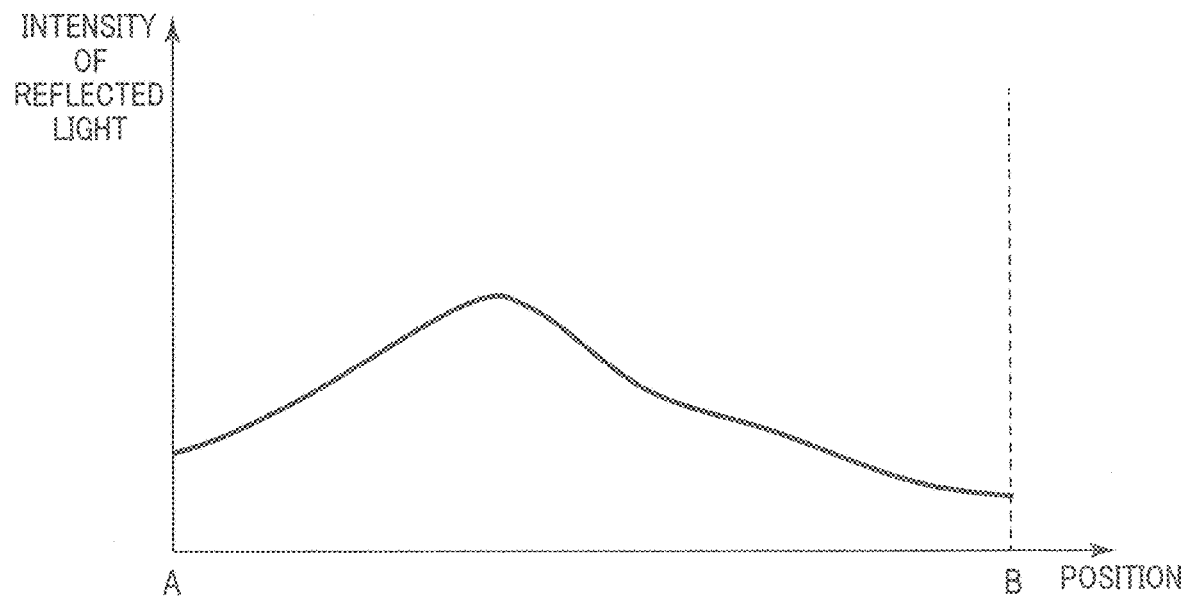
FIG. 15 is a diagram illustrating an example of a profile of the intensity of reflected light in the intensity image in the interval from the position A to the position B in FIG. 13 in the first application example of the present embodiment.

Based on the intensity of the reflected light or the intensity of the environmental light, the intensity image 102 is generated as the noise correlation map 102. Hereinafter, for the sake of concrete explanation, it is assumed that the intensity image 102 is an image showing the intensity of the reflected light. FIG. 15 is a diagram illustrating an example of the profile of the intensity of the reflected light in the intensity image 102 in the interval from the position A to the position B in FIG. 13. As illustrated in FIG. 15, the intensity of the reflected light is correlated with sawtooth-shaped noise as illustrated in FIG. 14.

(Step Sa3)

The distance image 101 and the intensity image 102 are input to the CNN 105. Specifically, the processing circuit 141 inputs the distance image 101 and the intensity image 102 to the input layer 103 by the input function 1415. More specifically, the processing circuit 141 inputs a plurality of pixel values in the distance image 101, which is generated in step Sa1, to a plurality of nodes in the first input range 104a of the input layer 103. The processing circuit 141 inputs a plurality of values in the intensity image 102, which is generated in step Sa2, to a plurality of nodes in the second input range 104b of the input layer 103.

The processing circuit 141 generates the combination data 104 by combining a plurality of pixel values in the distance image 101 and a plurality of pixel values in the intensity image 102 in the input layer 103 by the noise reduction function 1417. The processing circuit 141 outputs the combination data to the CNN 105.

Note that in a case where the second modification example is used in the present application example, the processing circuit 141 inputs the distance image 101 to the input layer 103 and inputs the intensity image 102 to at least one intermediate layer of the CNN 105.

(Step Sa4)

Figure 16:
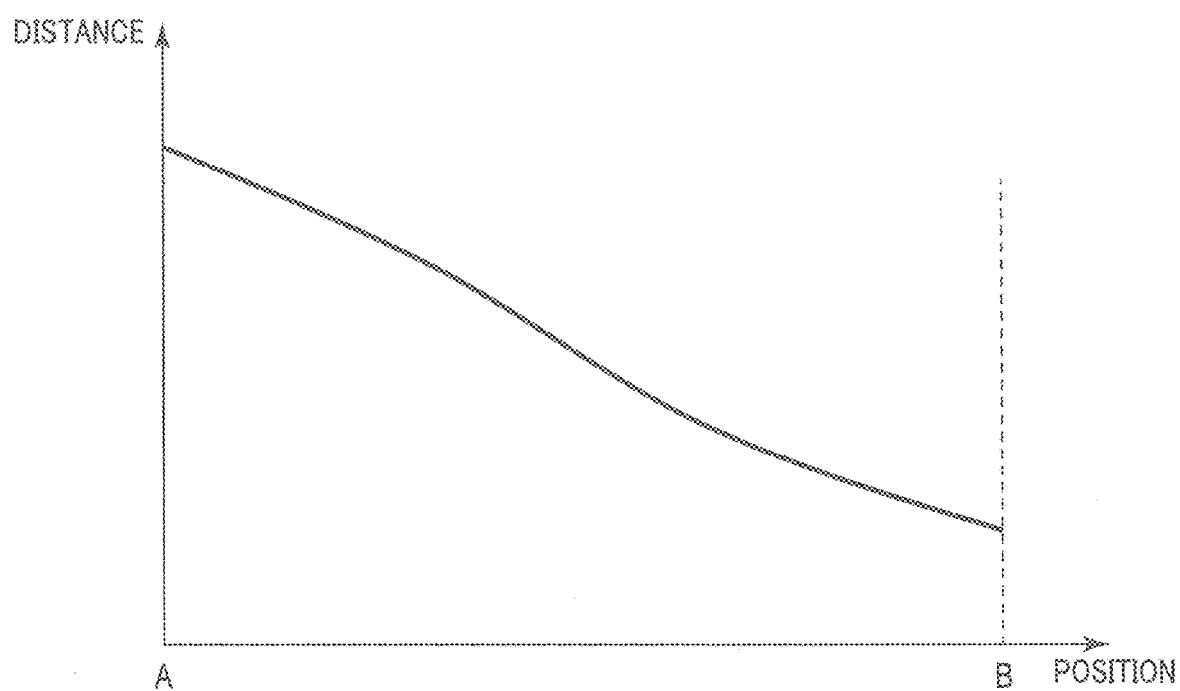
FIG. 16 is a diagram illustrating an example of a distance in a denoise image in the interval from the position A to the position B in FIG. 13 in the first application example of the present embodiment.

Therefore, a denoise image 108, in which the noise of the distance image 101 is reduced, is generated. Specifically, the processing circuit 141 generates the denoise image 108 by using the CNN 105 by executing the noise reduction program using the distance image 101 and the intensity image 102 by the noise reduction function 1417. FIG. 16 is a diagram illustrating an example of the distances in the denoise image 108 in the interval from the position A to the position B in FIG. 13. As illustrated in FIG. 16, sawtooth-shaped noise is reduced as compared with FIG. 13.

Note that as the processing target signal 101, the distance data measured by the distance image generation function 1411 before the generation of the distance image may be used. At this time, intensity data indicating the intensity of the reflected light or the intensity of the environmental light before the intensity image is generated, which is measured by the image sensor 115, is used as the reference signal 102. In these cases, since the denoise process can be understood by replacing the distance image with the distance data and replacing the intensity image with the intensity data, descriptions thereof will be omitted.

According to the processes by the above-described configuration, the following effects can be obtained.

According to the distance measuring apparatus 110 in the present application example, it is possible to generate a distance image by measuring the distances to the obstacle using the time until the emitted light is reflected by the obstacle and returned as reflected light, to generate the intensity image by measuring the intensity of reflected light or the intensity of environmental light, to store the learned model for generating the denoise image in which the noise of the distance image is reduced, based on the distance image and the intensity image, to input the distance image and the intensity image to the learned model, and to generate the denoise image 108 by using the learned model.

In addition, according to the distance measuring apparatus 110, it is possible to input the distance image and the intensity image to different channels of the input layer 103 in the neural network as the learned model. In addition, according to the distance measuring apparatus 110, the distance image is input to the input layer 103 in the neural network as the learned model and the intensity image is input to at least one of the intermediate layers in the neural network. In addition, according to the distance measuring apparatus 110, in each of the pixels, the intensity image having a pixel value correlated with a noise amount or a blur amount with respect to the distance can be input to the learned model.

From the above, according to the distance measuring apparatus 110 of the present application example, even if the intensity of the reflected light is small or there are many disturbances such as environmental light other than the reflected light, the error (noise) in the distance image can be reduced, and the accuracy of the distances in the distance image can be improved.

(Second Application Example)

The voice processing apparatus in the present application example mounts the processing circuit 141 in the present embodiment. The overall configuration of the voice processing apparatus 201 in the present application example will be described with reference to FIG. 17.

FIG. 17 is a diagram illustrating an example of the configuration of the voice processing apparatus 201. As illustrated in FIG. 17, the voice processing apparatus 201 includes a first microphone 202, a second microphone 203, a memory (storage unit) 207, an interface 209, and a processing circuit (processing unit) 141. The processing circuit 141 has an input function 1415 and a noise reduction function 1417 as in FIG. 1. The first microphone 202 and the second microphone 203 are an example of a voice acquisition unit that acquires voices in time series.

In the present application example, the processing target signal 101 corresponds to voice data (hereinafter, first voice data) acquired along the time series by the first microphone 202. In addition, the reference signal 102 corresponds to voice data (hereinafter, second voice data) acquired along the time series by the second microphone 203. The second voice data corresponds to the noise correlation data correlated with the voice noise of each time in the voice (first voice data) acquired by the first microphone 202.

Note that the first voice data and the second voice data are not limited to corresponding to the processing target signal 101 and the reference signal 102, respectively. That is, it is also possible to set the first voice data as the reference signal 102 and the second voice data as the processing target signal 101 by the operator's instruction via the interface 209 or the default setting. At this time, the first voice data corresponds to the noise correlation data. That is, the voice data (first voice data or second voice data) to be recognized, which is set by the operator, corresponds to the processing target signal 101. At this time, the noise corresponds to the voice data to be unrecognized.

For example, the correspondence relationship between the processing target signal 101 and the reference signal 102, and the first voice data and the second voice data can be appropriately changed according to an instruction or the like of the operator. The learned model that is performed by using the first voice data as the processing target signal 101 and using the second voice data as the reference signal 102 (hereinafter referred to as first voice NN) and the learned model that is performed by using the second voice data as the processing target signal 101 and using the first voice data as the reference signal 102 (hereinafter referred to as second voice NN) are different learned models. That is, the first voice NN and the second voice NN are learned by using different learning data. Therefore, when the correspondence can be appropriately changed according to the instruction of the operator via the interface 209, the first voice NN and the second voice NN are stored in the memory 207 in association with the correspondence.

Note that, in the present application example, in a case where the reference signal 102 is generated based on the processing target signal 101 as described in the first modification example, the processing circuit 141 of the voice processing apparatus 201 further includes a correlation data generation function 1419 as illustrated in FIG. 6. At this time, the first microphone 202 or the second microphone 203 is unnecessary. Hereinafter, for simplicity of explanation, it is assumed that the processing target signal 101 and the reference signal 102 are the first voice data and the second voice data, respectively. The first voice data and the second voice data are examples of one-dimensional data.

The first microphone 202 is, for example, a close-talking microphone. For example, the first microphone 202 acquires the voice of the speaking person. In addition, the first microphone 202 may be a microphone having directivity. The first microphone 202 generates the first voice data according to the voice acquired along the time series. The first microphone 202 outputs the first voice data to the processing circuit 141.

The second microphone 203 is a microphone that acquires ambient sounds such as surrounding sounds other than the speaking person, and is, for example, a non-directional microphone. For example, the second microphone 203 is a microphone with lower resolution than that of the first microphone 202. Since the second microphone 203 only needs to be able to measure the power of the environmental sound, it may be various sensors such as a sound pressure sensor configured by micro electro mechanical systems (MEMS), for example. The second microphone 203 generates the second voice data according to the voice acquired along the time series. The second microphone 203 outputs the second voice data to the processing circuit 141.

In the present application example, regarding the processing contents related to the first modification example and the second modification example, since it can be understood that the processing target signal 101 is replaced with the first voice data and the reference signal 102 is replaced with the second voice data, descriptions thereof will be omitted.

The memory 207 stores the first voice data, the second voice data, and the voice data (hereinafter referred to as denoise data) in which noise of the first voice data has been reduced by the noise reduction function 1417. The memory 207 stores the learned model for generating denoise data in which the noise of the first voice data is reduced along the time series based on the first voice data and the noise correlation data (second voice data) correlated to the noise of the voice for each time in the voice (first voice data). The memory 207 stores programs corresponding to various functions to be executed in the processing circuit 141. For example, the memory 207 stores a program (hereinafter referred to as a noise reduction program) for performing the CNN 105 corresponding to the above-described learned model.

The memory 207 is, for example, a semiconductor memory element such as ROM, RAM, or flash memory, a hard disk drive, a solid state drive, or an optical disk. In addition, the memory 117 may be a driving apparatus or the like that reads and writes a variety of information with a portable storage medium such as CD-ROM drive, DVD drive, or flash memory.

An interface 209 corresponds to a circuit or the like related to input and output with respect to the voice processing apparatus 201. The interface 209 receives an input instruction from an operator. In addition, the interface 209 receives various instructions or information inputs from an external device via a wireless or wired network. In addition, the interface 209 outputs the denoise data generated by the noise reduction function 1417 to the external device or the like via the wireless or wired network. Note that the interface 209 has a speaker (not illustrated) and may generate a voice corresponding to the denoise data according to an instruction from the operator.

The processing circuit 141 controls the voice processing apparatus 201 by a system control function (not illustrated). Various functions performed by the input function 1415 and the noise reduction function 1417 are stored in the memory 207 in the form of programs that are executable by a computer. The processing circuit 141 is a processor that realizes functions corresponding to the respective programs by reading programs corresponding to these various functions from the memory 207 and executing the read programs. In other words, the processing circuit 141 in a state in which each program is read has a plurality of functions illustrated in the processing circuit 141 of FIG. 17.

In FIG. 17, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The overall configuration of the voice processing apparatus 201 in the present application example has been described. Hereinafter, the input function 1415 and the noise reduction function 1417 in the present application example will be described in detail in the following description of the denoise process.

(Denoise Process)

Figure 18:
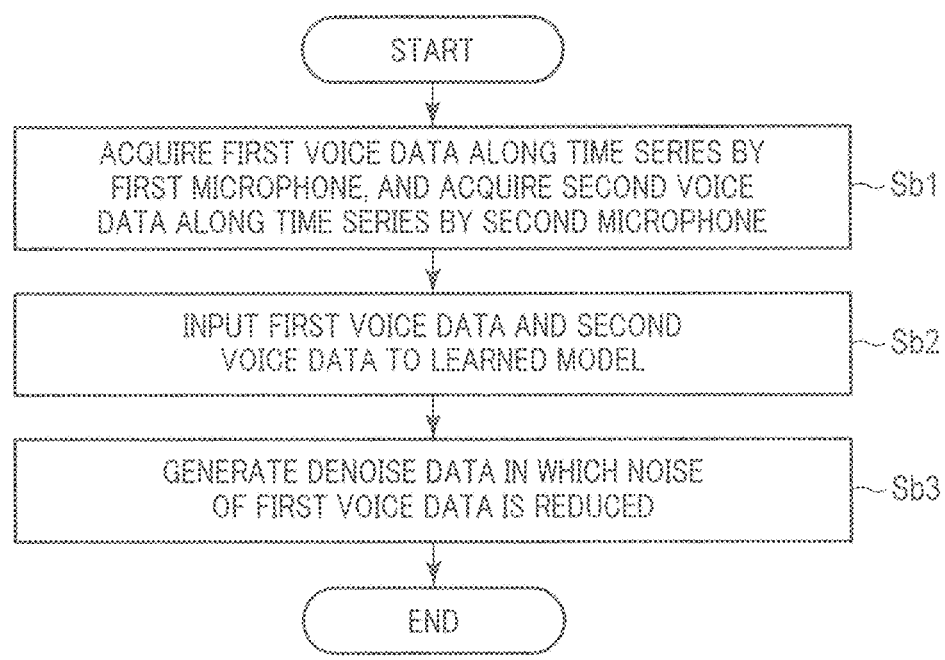
FIG. 18 is a flowchart showing an example of a procedure of a denoise process in the second application example of the present embodiment.

The denoise process in the present application example is a process of generating the denoise data 108 by executing the noise reduction program using the first voice data 101 and the second voice data 102. FIG. 18 is a flowchart showing an example of a procedure related to the denoise process in the present application example.

(Step Sb1)

Figure 19:
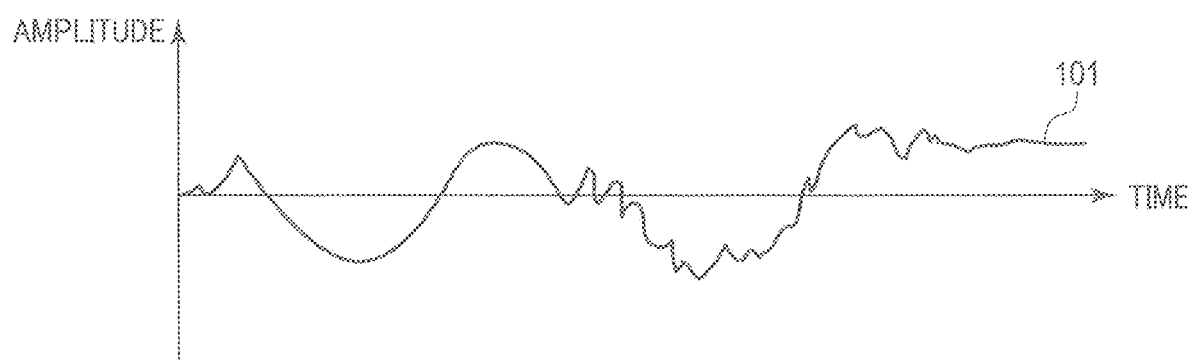
FIG. 19 is a diagram illustrating an example of first voice data in the second application example of the present embodiment.

The first microphone 202 acquires the first voice data 101 along the time series. At the same time, the second microphone 203 acquires the second voice data 102 corresponding to the noise correlation data along the time series. FIG. 19 is a diagram illustrating an example of the first voice data 101. As illustrated in FIG. 19, sawtooth-shaped noise appears in the first voice data 101.

(Step Sb2)

The first voice data 101 and the second voice data 102 are input to the learned model. Specifically, the processing circuit 141 inputs the first voice data 101 and the second voice data 102 to the input layer 103 by the input function 1415. More specifically, the processing circuit 141 inputs the amplitude value of the voice along the time series in the first voice data 101 to a plurality of nodes in the first input range 104a of the input layer 103. The processing circuit 141 inputs the amplitude value of the voice along the time series in the second voice data 102 to a plurality of nodes in the second input range 104b of the input layer 103.

The processing circuit 141 generates the combination data 104 by combining the amplitude values of the first voice data 101 and the amplitude values of the second voice data 102 in the input layer 103 by the noise reduction function 1417. The processing circuit 141 outputs the combination data to the CNN 105.

Note that in a case where the second modification example is used in the present application example, the processing circuit 141 inputs the first voice data 101 to the input layer 103 and inputs the second voice data 102 to at least one intermediate layer of the CNN 105.

(Step Sb3)

Figure 20:
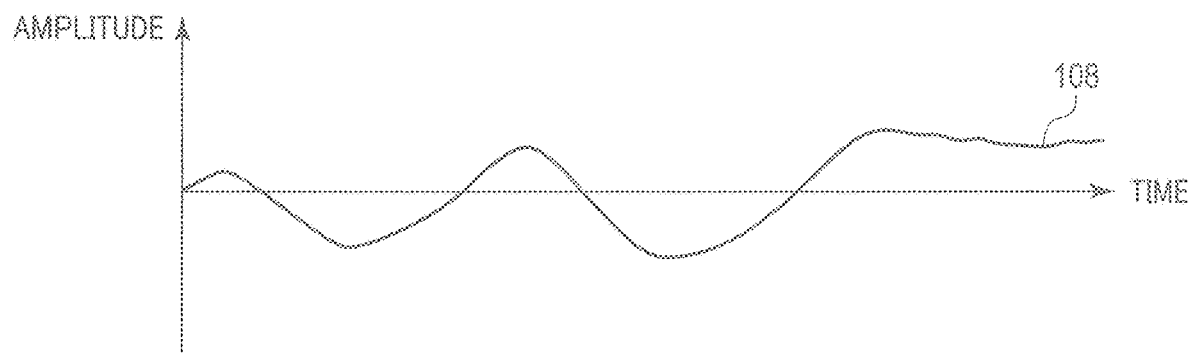
FIG. 20 is a diagram illustrating an example of denoise data along time series in the second application example of the present embodiment.

Denoise data 108, in which the noise of the first voice data 101 is reduced, is generated. Specifically, the processing circuit 141 generates the denoise data 108 by using the CNN 105 by executing the denoise reduction program using the first voice data 101 and the second voice data 102 by the noise reduction function 1417. FIG. 20 is a diagram illustrating an example of the denoise data 108 along the time series. As illustrated in FIG. 20, sawtooth-shaped noise is reduced as compared with FIG. 19. The processing circuit 141 outputs the denoise data 108 to the interface 209. The interface 209 outputs the denoise data as the voice from the speaker according to an instruction from the operator.

According to the processes by the above-described configuration, the following effects can be obtained.

According to the voice processing apparatus 201 of the present application example, it is possible to acquire the voice along the time series, to store the learned model for generating the denoise data, in which the noise of the voice is reduced, based on the voice data (first voice data) and the noise correlation data (second voice data) correlated with the noise of the voice for each time in the acquired voice, to input the voice data and the noise correlation data to the learned model, and to generate the denoise data by using the learned model. In addition, according to the voice processing apparatus 201, it is possible to further store the second learned model for generating the noise correlation data based on the voice data (first voice data), to input the voice data to the second learned model, and to generate the noise correlation data by using the second learned model.

As described above, according to the voice processing apparatus 201 of the present application example, in the voice recognition, for example, the recognition accuracy can be improved by previously reducing surrounding sounds other than the speaking person as noise. That is, according to the voice processing apparatus 201, as in the two-dimensional signal like the image described in the present embodiment, the one-dimensional voice signal along the time series can construct the neural network using the filter and the activation function. Therefore, according to the voice processing apparatus 201, for example, it is possible to effectively reduce the background sound in the first voice data by setting the voice signal (first voice da ta) including the time-series noise and the signal of background volume (second voice data) having, for example, the same time series in the input layer 103.

(Third Application Example)

The vibration measuring apparatus in the present application example mounts the processing circuit 141 in the present embodiment. The vibration measuring apparatus is used in non-destructive inspection for structures (bridges, buildings, dams, or the like). For example, the vibration measuring apparatus is used for crack detection such as cracks in these structures. The overall configuration of the vibration measuring apparatus 301 in the present application example will be described with reference to FIG. 21. FIG. 21 is a diagram illustrating an example of the configuration of the vibration measuring apparatus 301. As illustrated in FIG. 21, the vibration measuring apparatus 301 includes a first acceleration sensor 303, a second acceleration sensor 305, a memory (storage unit) 307, an interface 309, a display 311, and a processing circuit (processing unit) 141. In addition to a conversion function 3131, the processing circuit 141 has an input function 1415 and a noise reduction function 1417 as in FIG. 1. The first acceleration sensor 303 and the second acceleration sensor 305 are examples of a vibration measuring unit that measures vibration along the time series.

In the present application example, processing target data 101 corresponds to data (hereinafter referred to as first conversion data) in which Fourier transformation is performed on vibration data acquired along the time series by the first acceleration sensor 303 (hereinafter referred to as first vibration data). In addition, the reference signal 102 corresponds to data (hereinafter referred to as second conversion data) in which Fourier transformation is performed on vibration data acquired along the time series by the second acceleration sensor 305 (hereinafter referred to as second vibration data). The second conversion data corresponds to the noise correlation data correlated with the noise of the vibration for each frequency of the vibration (first vibration data) acquired by the first acceleration sensor 303. The first conversion data and the second conversion data correspond to the spectrum of the amplitude intensity with respect to the frequencies corresponding to the first vibration data and the second vibration data, respectively.

Note that the first conversion data and the second conversion data are not limited to corresponding to the processing target signal 101 and the reference signal 102, respectively. That is, it is also possible to set the first conversion data as the reference signal 102 and the second conversion data as the processing target signal 101 by the operator's instruction via the interface 309 or the default setting. At this time, the first conversion data corresponds to the noise correlation data. That is, the vibration data (first vibration data or second vibration data) to be recognized, which is set by the operator, corresponds to the processing target signal 101. At this time, the noise corresponds to the vibration data to be unrecognized.

For example, the correspondence relationship between the processing target signal 101 and the reference signal 102, and the first conversion data and the second conversion data can be appropriately changed according to an instruction or the like of the operator. The learned model that is performed by using the first conversion data as the processing target signal 101 and using the second conversion data as the reference signal 102 (hereinafter referred to as first vibration NN) and the learned model that is performed by using the second conversion data as the processing target signal 101 and using the first conversion data as the reference signal 102 (hereinafter referred to as second vibration NN) are different learned models. That is, the first vibration NN and the second vibration NN are learned by using different learning data. Therefore, when the correspondence can be appropriately changed according to the instruction of the operator via the interface 309, the first vibration NN and the second vibration NN are stored in the memory 307 in association with the correspondence.

Note that, in the present application example, in a case where the reference signal 102 is generated based on the processing target signal 101 as described in the first modification example, the processing circuit 141 of the vibration measuring apparatus 301 further includes a correlation data generation function 1419 as illustrated in FIG. 6. At this time, the first acceleration sensor 303 or the second acceleration sensor 305 is unnecessary. Hereinafter, for simplicity of explanation, it is assumed that the processing target signal 101 and the reference signal 102 are the first conversion data and the second conversion data, respectively. The first vibration data and the second vibration data are examples of one-dimensional data.

In the present application example, regarding the processing contents related to the first modification example and the second modification example, since it can be understood that the processing target signal 101 is replaced with the first vibration data and the reference signal 102 is replaced with the second vibration data, descriptions thereof will be omitted.

The first acceleration sensor 303 is constituted by, for example, MEMS and measures vibration in a structure. The first acceleration sensor 303 generates first vibration data according to the vibration measured along the time series. The first acceleration sensor 303 outputs the first vibration data to the processing circuit 141.

The second acceleration sensor 305 is constituted by, for example, MEMS and measures vibration around the vibration measured by the first acceleration sensor 303. For example, the second acceleration sensor 305 is a sensor with lower resolution than that of the first acceleration sensor 303. The second acceleration sensor 305 generates second vibration data according to the vibration measured along the time series. The second acceleration sensor 305 outputs the second vibration data to the processing circuit 141.

The memory 307 stores the first vibration data, the second vibration data, the first conversion data, the second conversion data, and data (hereinafter referred to as denoise data) in which noise of the first conversion data has been reduced by the noise reduction function 1417. In addition, the memory 307 stores data (hereinafter referred to as vibration denoise data) in which an inverse Fourier transformation has been performed on the denoise data. The memory 307 stores the learned model for generating denoise data in which the noise of the first vibration is reduced for each frequency based on the noise correlation data (second conversion data) correlated with the noise of the vibration for each frequency of the vibration (first vibration data) and the data (first conversion data) for each frequency of the vibration. The memory 307 stores programs corresponding to various functions to be executed in the processing circuit 141. For example, the memory 307 stores a program (hereinafter referred to as a noise reduction program) for performing the CNN 105 corresponding to the above-described learned model. Since the configuration example of the memory 307 is the same as that of the first and second application examples, descriptions thereof will be omitted.

An interface 309 corresponds to a circuit or the like related to input and output with respect to the vibration measuring apparatus 301. The interface 309 receives an input instruction from an operator. In addition, the interface 309 receives various instructions or information inputs from an external device via a wireless or wired network. In addition, the interface 309 outputs the denoise data generated by the noise reduction function 1417 to the external device or the like via the wireless or wired network.

The display 311 displays a variety of information. For example, the display 311 displays the vibration noise data generated by the conversion function 3131 in the processing circuit 141. In addition, the display 311 displays graphical user interface (GUI) or the like for receiving various operations from the operator. As the display 311, various arbitrary displays can be appropriately used. For example, a liquid crystal display, a CRT display, an organic electro-luminescence (EL) display, or a plasma display can be used as the display 42.

The processing circuit 141 controls the vibration measuring apparatus 301 by a system control function (not illustrated). Various functions performed by the conversion function 3131, the input function 1415, and the noise reduction function 1417 are stored in the memory 307 in the form of programs that are executable by a computer. The processing circuit 141 is a processor that realizes functions corresponding to the respective programs by reading programs corresponding to these various functions from the memory 307 and executing the read programs. In other words, the processing circuit 141 in a state in which each program is read has a plurality of functions illustrated in the processing circuit 141 of FIG. 21.

In FIG. 21, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The overall configuration of the vibration measuring apparatus 301 in the present application example has been described. Hereinafter, the conversion function 3131, the input function 1415, and the noise reduction function 1417 in the present application example will be described in detail in the following description of the denoise process.

(Denoise Process)

The denoise process in the present application example is a process of generating the denoise data 108 by executing the noise reduction program using the first conversion data 101 and the second conversion data 102. FIG. 22 is a flowchart showing an example of a procedure related to the denoise process in the present application example.

(Step Sc1)

The first acceleration sensor 303 acquires the first vibration data in time series. At the same time, the second acceleration sensor 305 acquires the second vibration data in time series. The first vibration data and the second vibration data are output to the processing circuit 141.

(Step Sc2)

The processing circuit 141 performs a Fourier transformation on the first vibration data by the conversion function 3131. The processing circuit 141 performs a Fourier transformation on the second vibration data. Through these Fourier transformations, the processing circuit 141 generates the first conversion data 101 and the second conversion data 102 corresponding to the first vibration data and the second vibration data, respectively.

(Step Sc3)

The first conversion data 101 and the second conversion data 102 are input to the learned model. Specifically, the processing circuit 141 inputs the first conversion data 101 and the second conversion data 102 to the input layer 103 by the input function 1415. More specifically, the processing circuit 141 inputs the intensity for each frequency of the vibration in the first conversion data 101 to a plurality of nodes in the first input range 104a of the input layer 103. The processing circuit 141 inputs the intensity for each frequency of vibration in the second conversion data 102 to a plurality of nodes in the second input range 104b of the input layer 103.

The processing circuit 141 generates the combination data 104 by combining the intensity for each frequency of the first conversion data 101 and the intensity for each frequency of the second conversion data 102, in the input layer 103 by the noise reduction function 1417. The processing circuit 141 outputs the combination data to the CNN 105.

Note that in a case where the second modification example is used in the present application example, the processing circuit 141 inputs the first conversion data 101 to the input layer 103 and inputs the second conversion data 102 to at least one intermediate layer of the CNN 105.

(Step Sc3)

The noise data 108 in which the noise of the first converted data is reduced for each frequency is generated. Specifically, the processing circuit 141 generates the denoise data 108 by using the CNN 105 by executing the denoise reduction program using the first conversion data 101 and the second conversion data 102 by the noise reduction function 1417.

(Step Sc4)

Vibration denoise data is generated by performing an inverse Fourier transformation on the denoise data. Specifically, the processing circuit 141 performs the inverse Fourier transformation on the denoise data by the conversion function 3131. The processing circuit 141 generates the vibration denoise data in which the noise of the first vibration data is reduced by the inverse Fourier transformation. The processing circuit 141 displays the vibration denoise data on the display 311.

As the modification of the present application example, the reference signal 102 may be a frequency characteristic (hereinafter referred to as a reference spectrum) of vibration related to a structure on which a nondestructive inspection is performed. The reference spectrum is obtained by simulating the natural vibration of the structure or the like on the condition of, for example, the shape of the structure, the foundation ground of the structure, and the season when non-destructive inspection is performed, thereby including the superimposed noise. The reference spectrum is stored in the memory 307 as corresponding to the noise correlation map. The processing circuit 141 inputs the first conversion data 101 and the reference spectrum 102 to the input layer 103 by the input function 1415. Next, the processing circuit 141 generates the denoise data 108 by using the CNN 105 by executing the denoise reduction program using the first conversion data 101 and the reference spectrum 102 by the noise reduction function 1417. The denoise data corresponds to the Fourier transformation of characteristic vibration data (hereinafter referred to as aged deterioration data) corresponding to aged deterioration of the structure. The CNN 105 of the present modification is generated by being learned by using the noise-including data obtained by superimposing the noise based on the reference spectrum on the aged deterioration data, the aged deterioration data, and the reference spectrum as one set of learning data.

According to the processes by the above-described configuration, the following effects can be obtained.

According to the vibration measuring apparatus 301 of the present application example, it is possible to measure the vibration along the time series, to store the learned model for generating denoise data in which the noise of the vibration is reduced for each frequency, based on the noise correlation data (second conversion data) correlated with the noise of vibration for each frequency in vibration and the data (first conversion data) for each frequency of the vibration, to input vibration data and noise correlation data to the learned model, and to generate the denoise data by using the learned model. In addition, according to the vibration measuring apparatus 301, it is possible to further store the second learned model for generating the noise correlation data based on the vibration data (first vibration data), to input the vibration data to the second learned model, and to generate the noise correlation data by using the second learned model.

Therefore, according to the vibration measuring apparatus 301 of the present application example, in the case of measuring the vibration of the object with the acceleration sensor, it is possible to improve the measurement accuracy by previously removing the surrounding vibration other than the measurement target. That is, for example, when the intensity of each frequency of the surrounding vibration is known, it is possible to generate the denoise data as the output signal from the output layer 107 by performing the Fourier transformation on the first vibration data as measurement data, setting the first vibration data to the input layer 103, and setting the frequency characteristics of the environmental vibration (second conversion data) in the input layer 103 as the reference signal 102. In addition, the vibration denoise data can be generated by performing the inverse Fourier transformation on the denoise data as necessary.

(Fourth Application Example)

The industrial CT apparatus of the present application example mounts the processing circuit 141 in the present embodiment. The industrial CT apparatus is used in non-destructive inspection of a structure including a product (various parts such as aluminum die cast, iron, casting, cylinder, tire, engine block, small electronic components, battery, molded product, resin, fiber, carbon-fiber-reinforced plastic(CFRP), glass-fiber-reinforced plastic (GFRP), or screw), or a part of the structure. Hereinafter, description will be made using products as structures. In the industrial CT apparatus used in non-destructive inspection or the like, the tomographic image is reconstructed from the transmission amount (sinogram) of X-rays collected while rotating the product around the rotation axis.

In the present application example, the image corresponding to the noise reduction target image 101 corresponds to, before the denoise process by the noise reduction function 1417 in FIG. 1, a sinogram based on projection data generated with respect to the CT scan on the product MA (hereinafter referred to as a pre-denoise sinogram) or an image reconstructed based on the pre-processed projection data (hereinafter referred to as pre-denoise CT image).

In addition, in the present application example, when the noise reduction target image 101 input to the input layer 103 is the pre-denoise sinogram, the noise correlation map 102 corresponds to, in the pre-denoise CT image, a map (hereinafter referred to as a transmission length map) showing the transmission length of the product along the ray of X-rays passing through the product for each rotation angle of the rotary table on which the structure is placed. The transmission length map corresponds to data in which the transmission length along the ray of X-ray incident on the X-ray detecting element from the focal point where the X-ray is generated is arranged, for example, by setting the rotation angle as the vertical axis and setting the element numbers of the plurality of X-ray detecting elements arranged in the channel direction as the horizontal axis. Hereinafter, for the sake of concrete explanation, it is assumed that the element numbers are 1 to M (M is a natural number). Note that the noise correlation map 102 is not limited to the transmission length map, and any image may be used as long as the image is correlated with the amount of noise in the pre-denoise CT image.

In addition, in the present application example, when the noise reduction target image 101 input to the input layer 103 is the pre-denoise CT image, the noise correlation map 102 corresponds to an image reconstructed using the transmission length map (hereinafter referred to as a transmission length reconstruction image).

In the present application example, processing contents in the case of performing denoise using the CT image before denoise will be described later. In addition, in the present application example, regarding the processing contents related to the first application example and the second application example, since it can be understood that the noise reduction target image 101 is replaced with the pre-denoise sinogram and the noise correlation map 102 is replaced with the transmission length map, descriptions thereof will be omitted.

FIG. 23 is a diagram illustrating an example of the configuration of the industrial CT apparatus 10 in the present application example. In the industrial CT apparatus 10, X-rays are emitted to the product MA from an X-ray tube 11, and the emitted X-rays are detected by an X-ray detector 13. The industrial CT apparatus 10 generates the pre-denoise CT image of the product MA based on the output from the X-ray detector 13. As illustrated in FIG. 23, the industrial CT apparatus 10 includes an X-ray tube 11, an X-ray detector 13, a rotary table 15, a rotary elevating mechanism 16, a shift mechanism 17, and a processing circuit 141.

The X-ray tube 11 irradiates the product MA arranged in the irradiation range 12 of the X-rays with a high dose X-ray which does not cause a metal artifact and can pass through the product MA. Specifically, the X-ray tube 11 includes a cathode for generating thermoelectrons, an anode for receiving thermoelectrons emitted from the cathode to generate X-rays, and a vacuum tube for holding the cathode and the anode. The X-ray tube 11 is connected to an X-ray high voltage apparatus (not illustrated) via a high voltage cable. A tube voltage is applied between the cathode and the anode by an X-ray high voltage apparatus. By applying the tube voltage, thermal electrons are emitted from the cathode toward the anode. Tube current flows as thermoelectrons are emitted from the cathode to the anode. By application of high voltage from the X-ray high voltage apparatus and supply of filament current, thermal electrons are emitted from the cathode (filament) to the anode (target). X-rays are generated at the focal point F by the thermal electrons colliding with the anode. For example, the X-ray tube 11 has a rotary anode type X-ray tube that generates X-rays by irradiating rotating anode with thermoelectrons.

The X-ray detector 13 detects X-rays emitted from the X-ray tube 11 and passing through the product MA and outputs an electric signal corresponding to the detected X-ray dose to the processing circuit 141. The X-ray detector 13 has a structure in which a plurality of X-ray detecting element arrays in which a plurality of X-ray detecting elements are arranged in the channel direction (z direction) are arranged in the slice direction (y direction). The X-ray detector 13 is, for example, an indirect conversion type detector having a grid, a scintillator array, and a photosensor array. Note that the X-ray detector 13 may be a direct conversion type detector having a semiconductor element for converting incident X-rays into electric signals. The X-ray detector is an example of the X-ray detection unit.

The product MA is placed on the rotary table 15. At this time, the product MA may be fixed to the rotary table 15 via a fixture. The rotary table 15 rotates around the rotation axis AR perpendicular to the optical axis OA of the X-ray and passing through the center C of the rotary table 15 by the rotary elevating mechanism 16 when executing the CT scan on the product MA. The optical axis OA of the X-ray is, for example, a straight line connecting the focal point F and the center of the X-ray detector 13. The rotary elevating mechanism 16 rotatably supports the rotary table 15 around the rotation axis AR. The rotary elevating mechanism 16 supports the rotary table 15 so as to be able to move up and down along the z-axis which is the vertical line. The rotary elevating mechanism 16 has a motor and a bearing for rotating the rotary table 15. In addition, the rotary elevating mechanism 16 includes a linear motion bearing, a guide rail, and a motor for lifting and lowering the rotary table 15. The rotary elevating mechanism 16 rotates and elevates the rotary table 15 under the control of the system control function 441 in the processing circuit 141.

The shift mechanism 17 supports the X-ray tube 11, the X-ray detector 13, and the rotary elevating mechanism 16. Specifically, the shift mechanism 17 supports at least one of the X-ray tube 11 and the X-ray detector 13 so as to be movable along the optical axis OA, so that the distance FDD between the X-ray tube 11 and the X-ray detector 13 can be changed. The shift mechanism 17 supports the rotary elevating mechanism 16 so as to be movable along the optical axis OA, so that a different distance between the focal point F and the rotation axis AR can be changed. The shift mechanism 17 has a linear motion bearing, a guide rail, and a motor for moving at least one of the X-ray tube 11 and the X-ray detector 13 and the rotary elevating mechanism 16 along the optical axis OA. Under the control of the system control function 441 in the processing circuit 141, the shift mechanism 17 moves at least one of the X-ray tube 11 and the X-ray detector 13 and the rotary elevating mechanism 16 along the optical axis OA.

The memory 41 is a storage apparatus such as HDD, SSD, integrated circuit storage device, or the like for storing a variety of information. The memory 41 stores, for example, the projection data generated by the pre-processing function 442 or the pre-denoise CT image generated by the reconstruction processing function 443, the denoise image generated by the noise reduction function 1417 (hereinafter referred to as denoise sinogram) 108, and the like. In addition, the memory 41 stores the learned model that is functioned to generate the denoise sinogram 108 with noise reduced in the pre-denoise sinogram 101, based on the pre-denoise sinogram 101 and the transmission length map 102. The memory 41 stores the transmission length map 102 used for the learned model. The memory 41 stores the CT image reconstructed based on the denoise sinogram 108 (hereinafter referred to as denoise CT image). In addition, the memory 41 stores programs corresponding to various functions to be executed in the processing circuit 141. For example, the memory 41 stores a noise reduction program for performing the CNN 105 corresponding to the above-described learned model.

The memory 41 may be a portable storage medium such as compact disc (CD), digital versatile disc (DVD), or flash memory, in addition to the HDD, the SSD, or the like. Note that the memory 41 may be a driving apparatus that reads and writes a variety of information with a semiconductor memory element such as flash memory or RAM.

The display 42 displays a variety of information. For example, the display 42 outputs the denoise CT image generated by the reconstruction processing function 443 in the processing circuit 141, graphical user interface (GUI) for receiving various operations from the operator, and the like. As the display 42, various arbitrary displays can be appropriately used. For example, a liquid crystal display, a CRT display, an organic electro-luminescence (EL) display, or a plasma display can be used as the display 42. In addition, the display 42 may be a desktop type display, or may be constituted by a tablet terminal or the like capable of wireless communication with the processing circuit 141.

The input interface 43 receives various input operations from the operator, converts the received input operation into an electric signal, and outputs the electric signal to the processing circuit 141. For example, the input interface 43 receives, from the operator, a collection condition for collecting projection data, a reconstruction condition for reconstructing the denoise CT image and the pre-denoise CT image, an image processing condition for generating the post-processing image from the denoise CT image, and the like. As the input interface 43, for example, a mouse, a keyboard, a switch, a button, a joystick, a touch pad, a touch panel display, and the like can be appropriately used. Note that, in the present embodiment, the input interface 43 is not limited to those having physical operation parts such as a mouse, a keyboard, a trackball, a switch, a button, a joystick, a touch pad, and a touch panel display. For example, an electric signal processing circuit that receives an electric signal corresponding to an input operation from an external input device provided separately from the apparatus and outputs the electric signal to the processing circuit 141 is also included in the example of the input interface 43. In addition, the input interface 43 may be constituted by a tablet terminal or the like capable of wireless communication with the processing circuit 141.

The processing circuit 141 controls the operation of the entire industrial CT apparatus 10 according to the electric signal of the input operation output from the input interface 43. For example, the processing circuit 141 includes, as a hardware resource, a processor such as a CPU, an MPU, a GPU, and a memory such as ROM and RAM. The processing circuit 141 executes a system control function 441, a pre-processing function 442, a reconstruction processing function 443, an image processing function 444, an input function 1415, a noise reduction function 1417, and the like by a processor that executes a program loaded into a memory. Note that the plurality of functions are not limited to the case where they are realized by a single processing circuit. A plurality of independent processors may be combined to form a processing circuit, and each of the processors executes a program to realize the plurality of functions. Note that, in the present application example, in a case where the noise correlation map is generated from the pre-denoise image as described in the first modification example, the processing circuit 141 further includes a correlation data generation function 1419 illustrated in FIG. 6.

The processing circuit 141 controls the X-ray high voltage apparatus, the rotary elevating mechanism 16, and the shift mechanism 17 so as to perform the CT scan on the product MA by the system control function 441. For example, before performing the CT scan on the product MA, the processing circuit 141 controls the rotary elevating mechanism 16 and the shift mechanism 17, so that the product MA is included in the irradiation range 12 according to the instruction from the operator via the input interface 43. Next, the processing circuit 141 controls the rotary elevating mechanism 16 so that the rotary table 15 is rotated once around the rotation axis AR over the execution period of the CT scan for the product MA. The processing circuit 141 that executes the system control function 441 is an example of a system control unit.

The processing circuit 141 performs the logarithmic transforming process on the detection data output from the X-ray detector 13, the offset correction process, the sensitivity correction process between channels, and pre-processing such as beam hardening correction by the pre-processing function 442. Therefore, the processing circuit 141 generates projection data corresponding to each of the rotation angles. The processing circuit 141 generates sinogram by using the projection data over the rotation angles. Note that the generation of the sinogram may be performed by the reconstruction processing function 443. The processing circuit 141 that executes the pre-processing function 442 is an example of a pre-processing unit.

The processing circuit 141 performs the reconstruction process on the projection data after pre-processing and before denoise process by using a filter corrected back projection method, a successive approximation reconstruction method, or the like by the reconstruction processing function 443, and generates data of the pre-denoise CT image. In addition, the processing circuit 141 performs the reconstruction process on the denoise sinogram 108 corresponding to the denoise image, and generates data of the denoise CT image. The processing circuit 141 that executes the reconstruction processing function 443 is an example of a reconstruction processing unit.

The processing circuit 141 converts the data of the denoise CT image generated by the noise reduction function 1417 into sectional image data of an arbitrary section or rendered image data of an arbitrary viewpoint direction by the image processing function 444. The conversion is performed based on the input operation received from the operator via the input interface 43. For example, the processing circuit 141 generating rendered image data in an arbitrary viewpoint direction by performing three-dimensional image process such as volume rendering to the data of the denoise CT image, surface volume rendering, image value projection processing, multi-planer reconstruction (MPR) processing, or curved MPR (CPR) processing. Note that the qreconstruction processing function 443 may directly generate the rendering image data in the arbitrary viewpoint direction.

The overall configuration of the industrial CT apparatus 10 in the present application example has been described. Hereinafter, the input function 1415, the noise reduction function 1417, and the like in the present application example will be described in detail in the following description of the denoise process.

(Denoise Process)

The denoise process of the present application example is a process of generating the denoise sinogram 108 by executing the noise reduction program using the pre-denoise sinogram 101 and the transmission length map 102. FIG. 24 is a flowchart showing an example of a procedure of the denoise process in the present application example.

(Step Sd1)

Projection data is generated by CT scan on the product MA. Specifically, the processing circuit 141 generates projection data by performing pre-processing on the detection data output from the X-ray detector 13 by the pre-processing function 442.

(Step Sd2)

The product image (structure image) is reconstructed based on the projection data. Specifically, the processing circuit 141 reconstructs the projection data by the reconstruction processing function 443, and reconstructs the pre-denoise CT image.

(Step Sd3)

Sinogram is generated based on the projection data. Specifically, the processing circuit 141 generates the pre-denoise sinogram 101 using the projection data over the rotation angles in the CT scan on the product MA by the pre-processing function 442.

Figure 25:
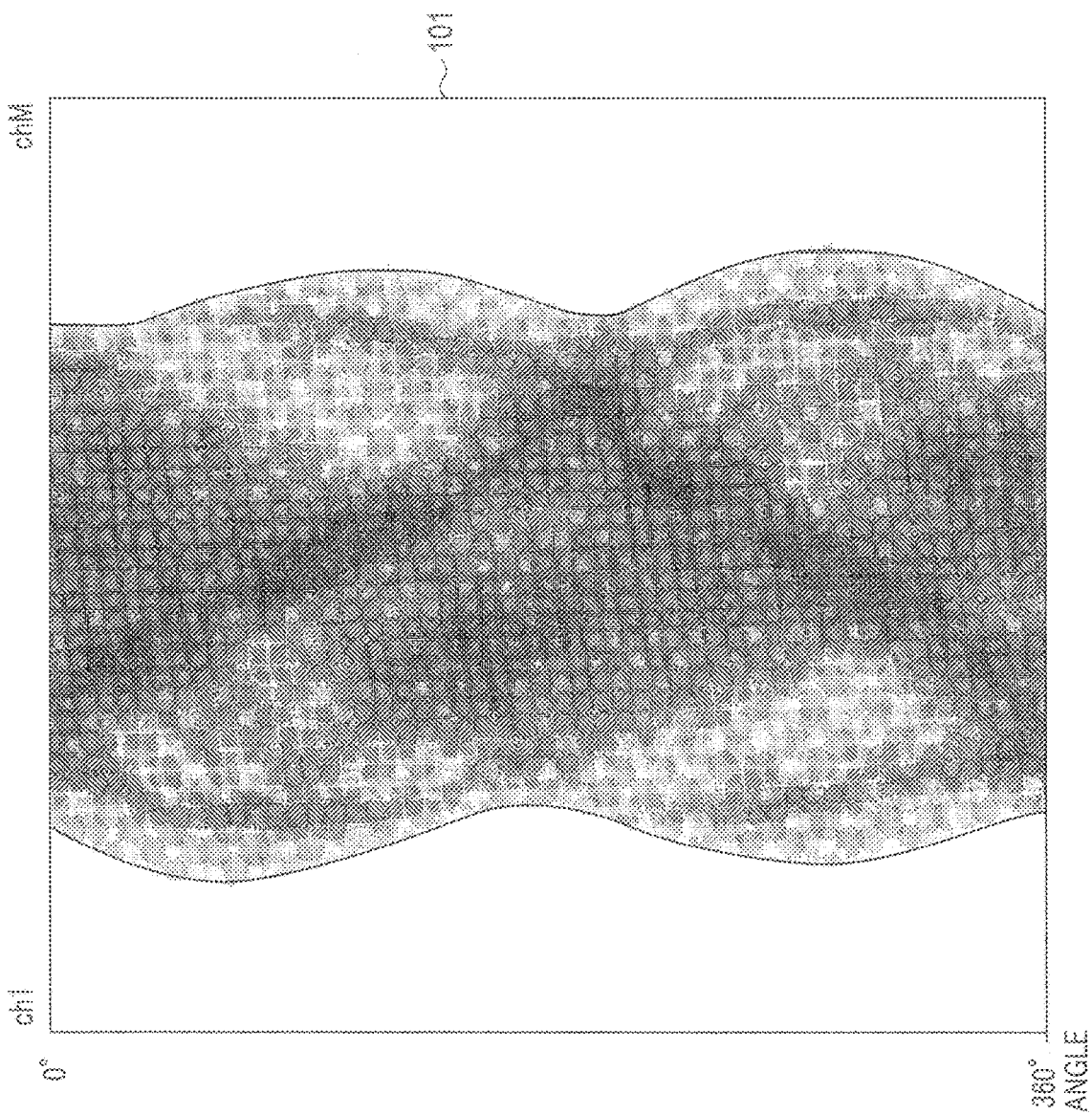
FIG. 25 is a diagram illustrating an example of a pre-denoise sinogram in the fourth application example of the present embodiment.

FIG. 25 is a diagram illustrating an example of the denoise sinogram 101. As illustrated in FIG. 25, the denoise sinogram 101 is generated by arranging the projection data corresponding to the rotation angle and the element number by setting the rotation angle of the rotary table 15 as the vertical axis and setting the element number of the X-ray detecting element arranged in the channel direction as the horizontal axis. As illustrated in FIG. 25, the pre-denoise sinogram 101 is unclear due to noise.

(Step Sd4)

The noise correlation map 102 corresponding to the pre-denoise sinogram 101 is generated based on the product image. Specifically, the processing circuit 141 calculates the transmission length along the ray of X-rays incident on each of the X-ray detecting elements at each of the rotation angles by using the pre-denoise CT image by the image processing function 444. The processing circuit 141 generates the transmission length map 102 as the noise correlation map by using transmission lengths associated with each of the rotation angles and each of the element numbers. Note that the generation of the transmission length map 102 may be performed by other functions in the processing circuit 141.

Figure 26:
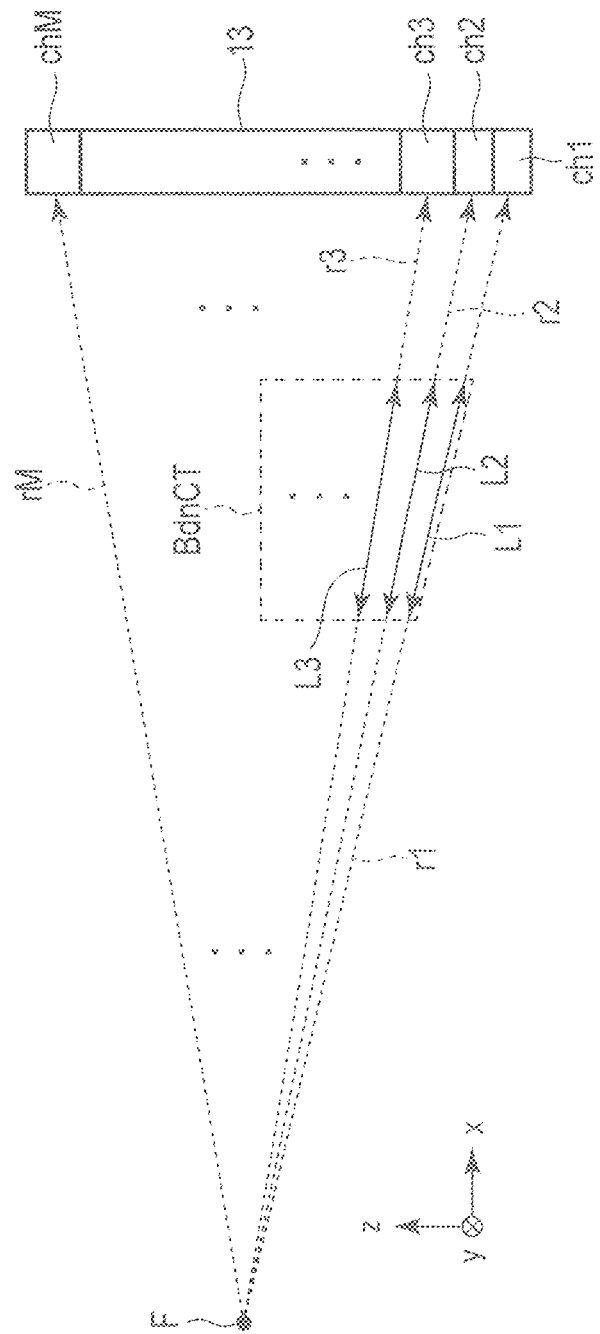
FIG. 26 is a diagram illustrating an example of a plurality of transmission lengths corresponding to a plurality of element numbers at a rotation angle of 0° in the fourth application example of the present embodiment.

FIG. 26 is a diagram illustrating an example of a plurality of transmission lengths corresponding to a plurality of element numbers at a rotation angle of 0°. As illustrated in the pre-denoise CT image BdnCT in FIG. 26, the ray r1 of the X-ray from the focal point F to the element number ch1 passes through the subject P with the transmission length L1. Similarly, rays r2, r3, and rM of the X rays from the focal point F to the element numbers ch2, ch3, and chM pass through the subject P with the transmission lengths L2, L3, and LM, respectively. In FIG. 26, the transmission length LM is zero.

FIG. 27 is a diagram illustrating an example of the transmission length map 102. As illustrated in FIG. 27, the transmission length map 102 is an image in which transmission lengths are arranged, for example, by setting the rotation angle as the vertical axis and setting the element number as the horizontal axis.

(Step Sd5)

The pre-denoise sinogram 101 and the noise correlation map 102 are input to the learned model. Specifically, the processing circuit 141 inputs the pre-denoise sinogram 101 and the transmission length map 102 to the input layer 103 by the input function 1415. More specifically, the processing circuit 141 inputs a plurality of pixel values in the pre-denoise sinogram 101, which is generated in step Sd3, to a plurality of nodes in the first input range 104*a* of the input layer 103. The processing circuit 141 inputs a plurality of values in the transmission length map 102, which is generated in step Sd4, to a plurality of nodes in the second input range 104*b* of the input layer 103.

The processing circuit 141 generates the combination data 104 by combining a plurality of pixel values in the pre-denoise sinogram 101 and a plurality of pixel values in the transmission length map 102 in the input layer 103 by the noise reduction function 1417. The processing circuit 141 outputs the combination data to the CNN 105.

Note that in a case where the second modification example is used in the present application example, the processing circuit 141 inputs the pre-denoise sinogram 101 to the input layer 103 and inputs the transmission length map 102 to at least one intermediate layer of the CNN 105.

(Step Sd6)

A denoise image with reduced sinogram noise is generated. Specifically, the processing circuit 141 generates the denoise sinogram 108 by executing the noise reduction program using the pre-denoise sinogram 101 and the transmission length map 102 by the noise reduction function 1417. The denoise sinogram 108 is an image with reduced noise in the denoise sinogram 101.

(Step Sd7)

A product image with reduced noise is generated by performing a reconstruction process on the denoise image. Specifically, the processing circuit 141 reconstructs the denoise CT image by executing the reconstruction process on the denoise sinogram 108 by the reconstruction processing function 443.

Hereinafter, as the modification of the present application example, the denoise process in the case of using the CT image before denoise as the product image 101 will be described. FIG. 28 is a flowchart showing an example of a procedure of the denoise process in the modification of the present application example. Since Steps Se1 and Se2 are the same process as Step Sd1 and Sd2, descriptions thereof will be omitted.

(Step Se3)

Data indicating the transmission length corresponding to the pre-denoise sinogram is generated based on the product image. The data indicating the transmission length corresponds to the transmission length map illustrated in FIG. 27.

(Step Se4)

A noise correlation map is generated by reconstructing the data indicating the transmission length. Specifically, the processing circuit 141 generates the transmission length reconstruction image by executing the reconstruction process on the data indicating the transmission length by the reconstruction processing function 443. The transmission length reconstruction image corresponds to the noise correlation map 102.

(Step Se5)

The pre-denoise CT image 101 and the transmission length reconstruction image 102 are input to the learned model. Specifically, the processing circuit 141 inputs the pre-denoise CT image 101 and the transmission length reconstruction image 102 to the input layer 103 by the input function 1415. More specifically, the processing circuit 141 inputs a plurality of pixel values in the pre-denoise reconstruction image 101, which is generated in step Se2, to a plurality of nodes in the first input range 104*a* of the input layer 103. The processing circuit 141 inputs a plurality of values in the transmission length reconstruction image 102, which is generated in step Se4, to a plurality of nodes in the second input range 104*b* of the input layer 103.

The processing circuit 141 generates the combination data 104 by combining a plurality of pixel values in the pre-denoise CT image 101 and a plurality of pixel values in the transmission length reconstruction image 102 in the input layer 103 by the noise reduction function 1417. The processing circuit 141 outputs the combination data to the CNN 105.

Note that in a case where the second modification example is used in the present application example, the processing circuit 141 inputs the pre-denoise CT image 101 to the input layer 103 and inputs the transmission length reconstruction image 102 to at least one intermediate layer of the CNN 105.

(Step Se6)

A denoise image 108 in which the noise of the pre-denoise pre-CT image 101 is reduced is generated. The denoise image corresponds to the denoise CT image. Specifically, the processing circuit 141 generates the denoise CT image 108 by executing the noise reduction program using the pre-denoise CT image 101 and the transmission length reconstruction image 102 by the noise reduction function 1417.

According to the processes by the above-described configuration, the following effects can be obtained.

According to the industrial CT apparatus 10 of the present application example, it is possible to store the learned model functioned to generate the denoise image, in which the noise of the product image or the noise of the intermediate image is reduced, based on the product image (pre-denoise CT image) generated based on the projection data collected with respect to the product MA, the intermediate image (pre-denoise sinogram) at the front stage for generating the product image, and the noise correlation map (transmission length map or transmission length reconstruction image) correlated with noise included in the product image or the intermediate image, to input the product image or the intermediate image and the noise correlation map to the learned model, and to generate the denoise image, in which the nose of the product image or the noise of the intermediate image is reduced, by using the learned model.

In addition, according to the industrial CT apparatus 10, the pre-denoise CT image or the pre-denoise sinogram and the noise correlation map 102 can be input to mutually different channels of the input layer 103 in the neural network as the learned model. Further, according to the industrial CT apparatus 10, it is possible to store the second learned model functioned to generate the noise correlation map based on the pre-denoise CT image or the pre-denoise sinogram in the memory 41, to input the pre-denoise CT image or the pre-denoise sinogram to the second learned model, and to generate the noise correlation map by using the second learned model.

In addition, according to the industrial CT apparatus 10, the pre-denoise CT image or the pre-denoise sinogram can be input to the input layer 103 of the neural network as the learned model, and the noise correlation map can be input to at least one of the intermediate layers in the neural network. Therefore, since the degree of freedom in which the output changes according to the amount of noise is obtained in the intermediate layer to which the noise correlation map 102 is input, it is possible to reduce noise with an intensity corresponding to the amount of noise for each partial region in the pre-denoise CT image or the pre-denoise sinogram 101.

From the above, since the transmission amount of X-rays decreases at a thick portion of the product MA, even in the case where the noise relative to the detection signal of the X-rays relatively increases and the noise increases in the central portion of the sinogram or the tomographic image, the industrial CT apparatus 10 can effectively reduce the noise of the tomographic image of the product MA by using the sinogram or the tomographic image as the processing target signal 101 and using the noise correlation map calculated from the length of X-rays passing through the product MA as the reference signal 102.

As the modifications of the present embodiment and the application examples, the technical ideas related to the distance measuring apparatus 110, the voice processing apparatus 201, the vibration measuring apparatus 301, and the industrial CT apparatus 10 can also be realized by installing the noise reduction program on the computer such as a workstation and decompressing the noise reduction program on the memory. The program that allows the computer to perform the method can also be stored and distributed in various portable storage media such as a magnetic disk, an optical disk, a semiconductor memory, and the like.

According to the distance measuring apparatus 110, the voice processing apparatus 201, the vibration measuring apparatus 301, the industrial CT apparatus 10, and the distance measuring method related to the embodiments and application examples described above, it is possible to improve the accuracy or noise reduction. That is, according to the present embodiment, application examples, and the like, in addition to the processing target signal 101 such as the noise reduction target image, the reference signal 102 such as the noise correlation map indicating the spatial distribution of the noise amount is input to the CNN 105, thereby providing the distance measuring apparatus 110, the voice processing apparatus 201, the vibration measuring apparatus 301, the industrial CT apparatus 10, and the distance measuring method, which can improve the accuracy of noise reduction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A distance measuring apparatus comprising:
    a processing circuit which generates a distance image by measuring distances to an obstacle by using time until emitted light is reflected from the obstacle and returned as reflected light, and generates an intensity image by measuring intensity of environmental light other than intensity of the reflected light; and
    a memory which stores a learned model for generating a denoise image, in which noise of the distance image is reduced, based on the distance image and the intensity image,
    wherein the intensity of the environmental light indicates an average of received light, intensity over the time, and
    wherein the processing circuit generates the intensity image in which the intensity of the environmental light is arranged for each pixel, inputs the distance image and the intensity image to the learned model, and generates the denoise image by using the learned model.

2. The distance measuring apparatus according to claim wherein the learned model is a neural network, and
    the processing circuit inputs the distance image and the intensity image to different channels of an input layer in the neural network.

3. The distance measuring apparatus according to claim 1, wherein the learned model is a neural network, and
    the processing circuit inputs the distance image to an input layer in the neural network and inputs the intensity image to at least one of a plurality of intermediate layers in the neural network.

4. The distance measuring apparatus according to claim 1, wherein the intensity image has a pixel value correlated with a noise amount or a blur amount with respect to each of the distances corresponding to a plurality of pixels, respectively.

* * * * *